US009500888B2

(12) United States Patent
Schwartz et al.

(10) Patent No.: US 9,500,888 B2
(45) Date of Patent: Nov. 22, 2016

(54) ELECTRONICALLY SWITCHABLE PRIVACY DEVICE

(71) Applicant: 3M INNOVATIVE PROPERTIES COMPANY, St. Paul, MN (US)

(72) Inventors: Evan L. Schwartz, Vadnais Heights, MN (US); Mark J. Pellerite, Woodbury, MN (US); Encai Hao, Woodbury, MN (US); Michael L. Steiner, New Richmond, WI (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 14/772,246

(22) PCT Filed: Mar. 7, 2014

(86) PCT No.: PCT/US2014/021538
§ 371 (c)(1),
(2) Date: Sep. 2, 2015

(87) PCT Pub. No.: WO2014/164257
PCT Pub. Date: Oct. 9, 2014

(65) Prior Publication Data
US 2016/0011441 A1    Jan. 14, 2016

Related U.S. Application Data

(60) Provisional application No. 61/778,995, filed on Mar. 13, 2013.

(51) Int. Cl.
G02B 26/00 (2006.01)
G02F 1/00 (2006.01)
(Continued)

(52) U.S. Cl.
CPC ............. *G02F 1/1323* (2013.01); *G02B 26/02* (2013.01); *G02F 1/1521* (2013.01); *G02F 1/161* (2013.01); *G02F 1/163* (2013.01); *G02F 2001/1557* (2013.01)

(58) Field of Classification Search
USPC ....... 359/237, 245, 250, 251, 252, 254, 265, 359/266, 269, 270, 271, 290, 291, 292, 295, 359/298, 315
See application file for complete search history.

(56) References Cited

U.S. PATENT DOCUMENTS 4,766,023 A    8/1988  Lu
5,268,782 A    12/1993 Wenz
(Continued)

FOREIGN PATENT DOCUMENTS

WO    WO 2011-132992    10/2011
WO    WO 2012-033583    3/2012
(Continued)

OTHER PUBLICATIONS

Abbrent, "Gel electrolytes prepared from oligo(ethylene glycol) dimethacrylate: glass transition, conductivity and Li$^+$-coordination", Electrochimica Acta, 1998, vol. 43, No. 10-11, pp. 1185-1191.
(Continued)

*Primary Examiner* — Joseph P Martinez
*Assistant Examiner* — Brandi Thomas

(57) ABSTRACT

An electronically switchable privacy device suitable for use in display devices is described. The electronically switchable privacy device comprises a first transparent electrode layer, an electronically switchable layer disposed adjacent to the first transparent electrode layer, and a second transparent electrode layer disposed adjacent to the electronically switchable layer and opposite the first transparent electrode layer. The second transparent electrode layer comprises a transparent substrate layer having a plurality of microstructured ribs extending across a major surface of the transparent substrate layer such that the microstructured ribs form an alternating series of ribs and channels, each channel having channel walls defined by adjacent ribs. A plurality of transparent electrode members comprising a transparent electrode material are disposed on at least one channel wall in a corresponding plurality of the channels; and a bus member provides electrical connectivity across the plurality of transparent electrode members. A spacer element disposed in the electronically switchable layer keeps the first transparent electrode layer spaced apart from the second transparent electrode layer. A portion of the electronically switchable layer at least partially fills the plurality of channels and makes electrical contact with the plurality of transparent electrode members. The electronically switchable layer comprises an electronically switchable material capable of modulation between high and low light absorption states upon application of a direct current voltage across the first and second transparent electrode layers.

19 Claims, 9 Drawing Sheets

(51) Int. Cl.
  *G02B 26/08* (2006.01)
  *G02F 1/29* (2006.01)
  *G02F 1/13* (2006.01)
  *G02B 26/02* (2006.01)
  *G02F 1/15* (2006.01)
  *G02F 1/161* (2006.01)
  *G02F 1/163* (2006.01)
  *G02F 1/155* (2006.01)

(56) References Cited

U.S. PATENT DOCUMENTS

| | | |
|---|---|---|
| 6,301,038 B1 | 10/2001 | Fitzmaurice et al. |
| 6,398,370 B1 | 6/2002 | Chiu et al. |
| 6,870,657 B1 | 3/2005 | Fitzmaurice et al. |
| 7,057,810 B2 | 6/2006 | Thomas et al. |
| 7,404,919 B2 | 7/2008 | Yokoyama et al. |
| 7,576,201 B2 | 8/2009 | Fitzmaurice et al. |
| 7,586,663 B1 | 9/2009 | Radmard et al. |
| 7,618,680 B2 | 11/2009 | Gleason et al. |
| 7,626,748 B2 | 12/2009 | Radmard et al. |
| 8,012,567 B2 | 9/2011 | Gaides et al. |
| 8,107,153 B2 | 1/2012 | Sotzing et al. |
| 8,133,572 B2 | 3/2012 | Gaides et al. |
| 2005/0174529 A1 | 8/2005 | Fukushima et al. |
| 2007/0160811 A1 | 7/2007 | Gaides et al. |
| 2010/0201242 A1 | 8/2010 | Liu et al. |
| 2010/0245973 A1 | 9/2010 | Wang et al. |
| 2010/0271721 A1 | 10/2010 | Gaides et al. |
| 2010/0315693 A1 | 12/2010 | Lam et al. |
| 2011/0233532 A1 | 9/2011 | Sotzing et al. |
| 2011/0317240 A1 | 12/2011 | Sotzing et al. |
| 2013/0050798 A1 | 2/2013 | Kim et al. |
| 2013/0271811 A1* | 10/2013 | Lam .......................... E06B 9/24 359/266 |
| 2014/0036343 A1* | 2/2014 | Ma ....................... G02B 26/001 359/291 |

FOREIGN PATENT DOCUMENTS

| | | |
|---|---|---|
| WO | WO 2012-145157 | 10/2012 |
| WO | WO 2013-048847 | 4/2013 |
| WO | WO 2013-049088 | 4/2013 |

OTHER PUBLICATIONS

Amb, "Spray-Processable Blue-to-Highly Transmissive Switching Polymer Electrochromes via the Donor-Acceptor Approach," Adv. Mater., 2010, vol. 22, pp. 724-728.

Ding, "A Simple, low waste and versatile procedure to make polymer electrochromic devices," J. Mater. Chem., 2011, vol. 21, pp. 11873-11878.

Mortimer, "Electrochromic Materials," Annu Rev. Mater Res., 2011, vol. 41, pp. 241-268.

Seshadri, "Optimization, preparation, and electrical short evaluation for 30 $cm^2$ active area dual conjugated polymer electrochromic windows," Organic Electronics, 2007, vol. 8, pp. 367-381.

Shaw, "Negative photoresists for optical lithography," IBM J. Res. Develop., 1997, vol. 41, No. ½, pp. 81-94.

International Search report for PCT International Application No. PCT/US2014/021538 mailed on Jun. 26, 2014, 3 pages.

* cited by examiner

ELECTRONICALLY SWITCHABLE PRIVACY DEVICE

CROSS REFERENCE TO RELATED APPLICATIONS

This application is a national stage filing under 35 U.S.C. 371 of PCT/US2014/021538, filed Mar. 7, 2014, which claims priority to U.S. Provisional Application No. 61/778, 995, filed Mar. 13, 2013, the disclosures of which are incorporated by reference in their entireties herein.

TECHNICAL FIELD

This disclosure relates to optical films and electronically switchable privacy devices that include the optical films. The electronically switchable privacy devices can be used with electronic display devices.

BACKGROUND

Privacy films are known in the art of electronic display devices. A viewer can apply a privacy film to the viewing surface of an electronic display device such that images can be viewed selectively. Typically, when the viewer is positioned within a range of small viewing angles relative to the normal of the surface of the privacy film, images being displayed are viewable through the film. As the position of the viewer changes such that the viewing angle increases relative to the normal, the amount of coherent light transmitted through the privacy film decreases until a maximum viewing angle is reached and images being displayed are no longer viewable.

SUMMARY

An electronically switchable privacy device is disclosed. The device can be used in a privacy mode when a user wishes to restrict viewing of information being displayed by an electronic display device. When the user wishes to share information being displayed, the electronically switchable privacy device can be switched to a public mode for sharing. The viewer can switch back and forth between modes without having to physically remove the privacy device from the viewing surface of the electronic display device.

The electronically switchable privacy device can be used in different ways. For example, the privacy device may be applied to the viewing surface of a display device and powered by a universal serial bus ("USB") adapter with the use of a built-in transformer circuit. The electronically switchable privacy device may also be incorporated into a display device during manufacture of the device, for example, between a display panel and an outer viewing surface of the display device, such as a touch screen. When built into a display device, the power for the privacy device could be drawn from a battery or electrical outlet. Such a display device would have built-in public and privacy modes, and a consumer would not need to purchase and install a separate privacy device.

In a first aspect, the present disclosure provides a privacy device that is electronically switchable, having a first transparent electrode layer, an electronically switchable layer disposed adjacent to the first transparent electrically conductive layer, and a second transparent electrode layer disposed adjacent to the electronically switchable layer and opposite the first transparent electrically conductive layer. The first transparent electrode layer includes a first transparent substrate layer and a first transparent electrically conductive layer disposed on a major surface of the first transparent substrate layer, wherein the first transparent substrate layer is flexible. The second transparent electrode layer has a plurality of microstructured ribs extending across a major surface of the second transparent substrate layer such that the microstructured ribs form an alternating series of ribs and channels, each channel having channel walls defined by adjacent ribs. A plurality of transparent electrode members having a transparent electrode material is disposed on at least one channel wall in a corresponding plurality of the channels. A bus member provides electrical connectivity across the plurality of second transparent electrode members. A spacer element disposed in the electronically switchable layer keeps the first transparent electrode layer spaced apart from the second transparent electrode layer.

A portion of the electronically switchable layer at least partially fills the plurality of channels and makes electrical contact with the plurality of transparent electrode members. The electronically switchable layer includes an electronically switchable material capable of modulation between high and low light absorption states upon application of a direct current voltage across the first and second transparent electrode layers. When a first direct current voltage is applied, the film is in a privacy mode such that it has a light transmission of less than about 10% at viewing angle of 30°. When a second direct current voltage is applied, the film is in a share mode such that it has an increase in light transmission and the difference in transmission between the privacy mode and the share mode is at least 5% for viewing angles from about 30° to about 45°. The film has a light transmission of at least about 25% in share and privacy modes at viewing angles from 0° to about 15°.

In a second aspect, the present disclosure provides an article that includes the privacy device of the first aspect, and circuitry for supplying the necessary electric voltage for switching between public/share and privacy modes.

In a third aspect, the present disclosure provides a display device that includes a display pixel array; a display cover surface adjacent the display pixel array, the display cover surface comprising a viewing surface opposite the display pixel array; and the privacy device of the first aspect disposed on the viewing surface.

DETAILED DESCRIPTION

Privacy films are known and are purchased generally as aftermarket items for use with electronic display devices, particularly when one does not want others to see the contents of the screen. A user physically applies the privacy film to the viewing surface of their display device, and the information being displayed on the viewing surface can be viewed only within a range of angles referred to herein as "viewing angle". Typically, the viewing angle is some range of angles centered on an axis normal to the privacy film, for example, 0°+/−30°. Many types of privacy films can be characterized as "static" privacy films having a single privacy mode. If the viewing surface is covered with a static privacy film, and the user wants others to see the contents of the screen, the privacy film needs to be physically removed from the surface and stored in a location where it does not become damaged.

One type of static privacy film comprises a transparent louver film disposed on a polymeric substrate, with light absorbing material disposed in channels formed between the louvers such that alternating transparent and light absorbing regions are formed. The transparent and light absorbing regions are relatively positioned to provide a restricted viewing angle. An exemplary privacy film of this type is described in U.S. Pat. No. 6,398,370 (Chiu et al.).

The electronically switchable privacy device disclosed herein is different from a conventional privacy film, such as a static privacy film, because a user can switch between share and privacy modes without having to remove the film from the viewing surface of their display device. Switching can be carried out via an external hardware or software-controlled switch electrically coupled to the film. In some embodiments, in the "on" state, in which voltage of one polarity is applied to the device, the electronically switchable privacy device is in the share mode, and in the "off" state, accessed by applying voltage of the opposite polarity, the privacy device is in the privacy mode. Thus, a user can switch back and forth between the two modes by changing the properties of the direct current voltage. Typically, the first direct current voltage is opposite in sign to the second direct current voltage (e.g., the first direct current voltage can be "positive", and the second direct current voltage can be "negative"). Also, the device typically reverts back over time to the privacy mode when no voltage is applied.

Figure 1A:
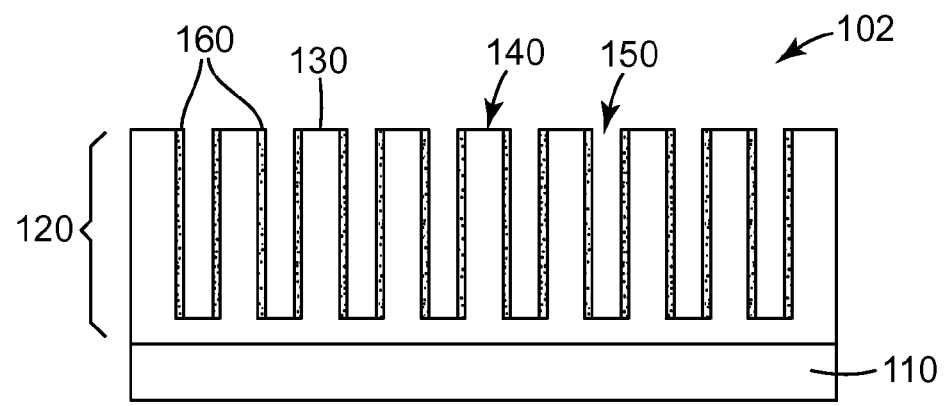
FIGS. 1A and 1B show schematic cross-sectional and perspective views, respectively, of an exemplary microstructured transparent electrode film from which an electronically switchable privacy device can be made.
Figure 1B:
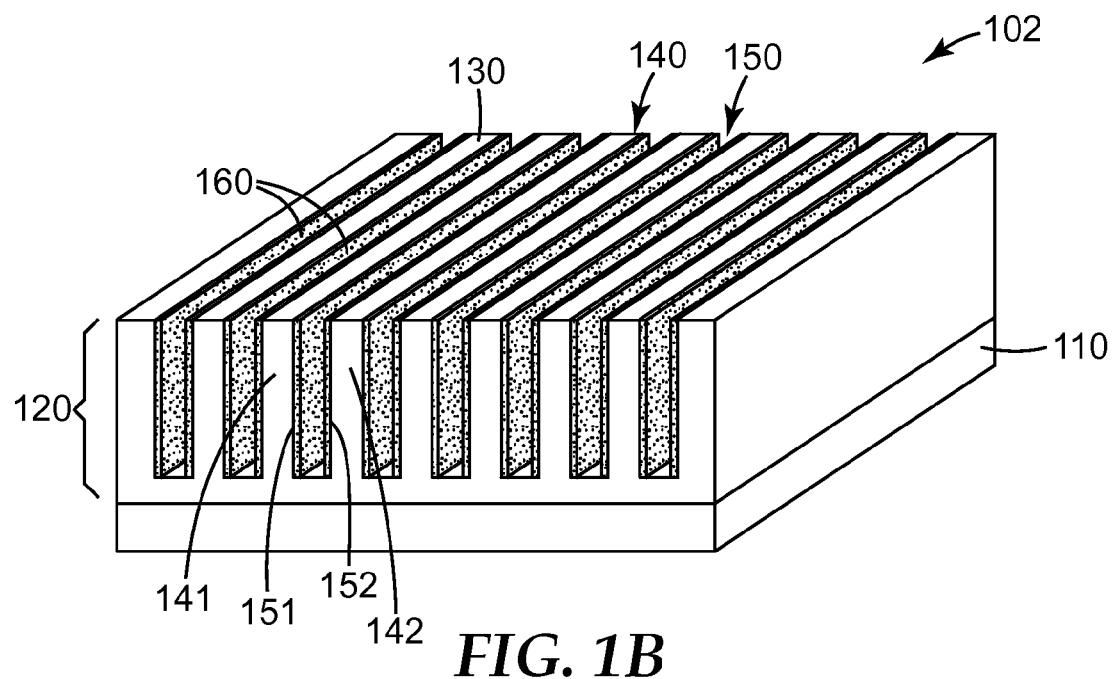

FIG. 1A shows a schematic cross-sectional view of an exemplary optical film 102 from which the electronically switchable privacy device can be made. Optical film 102 is a transparent electrode layer, including transparent substrate layer 110 and optically transparent microstructured layer 120 disposed on transparent substrate layer 110. Transparent substrate layer 110 is typically a flexible layer, as defined by the ability to wrap substrate layer 110 around a cylindrical mandrel of 2.5 cm diameter without damaging the integrity of said layer. Optically transparent microstructured layer 120 comprises a plurality of microstructured ribs 140 extending across surface 130 of optically transparent microstructured layer 120. FIG. 1B shows another view of optical film 102 wherein microstructured ribs 140 extend across major surface 130 of the optically transparent microstructured layer 120 such that an alternating series of ribs 140 and channels 150 are formed. Each channel 150 has channel walls (e.g., 151, 152) defined by adjacent ribs (e.g., 141, 142).

Optical film 102 includes a plurality of transparent electrode members 160 comprising a transparent electrode material disposed on at least one channel wall in a corresponding plurality of channels 150. In some embodiments, for example in the embodiments shown in FIGS. 1A and 1B, transparent electrode material is disposed on both of the channel walls in the corresponding plurality of the channels.

Figure 2A:
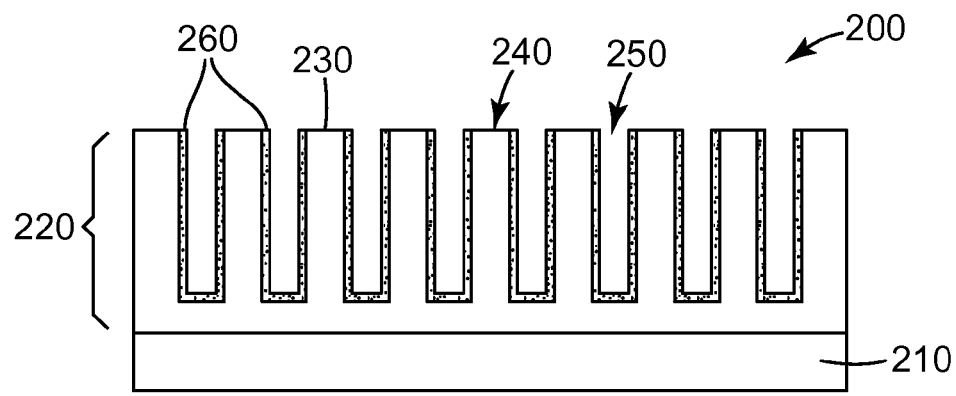
FIGS. 2A and 2B show schematic cross-sectional and perspective views, respectively, of another embodiment of an exemplary microstructured transparent electrode film from which an electronically switchable privacy device can be made.
Figure 2B:
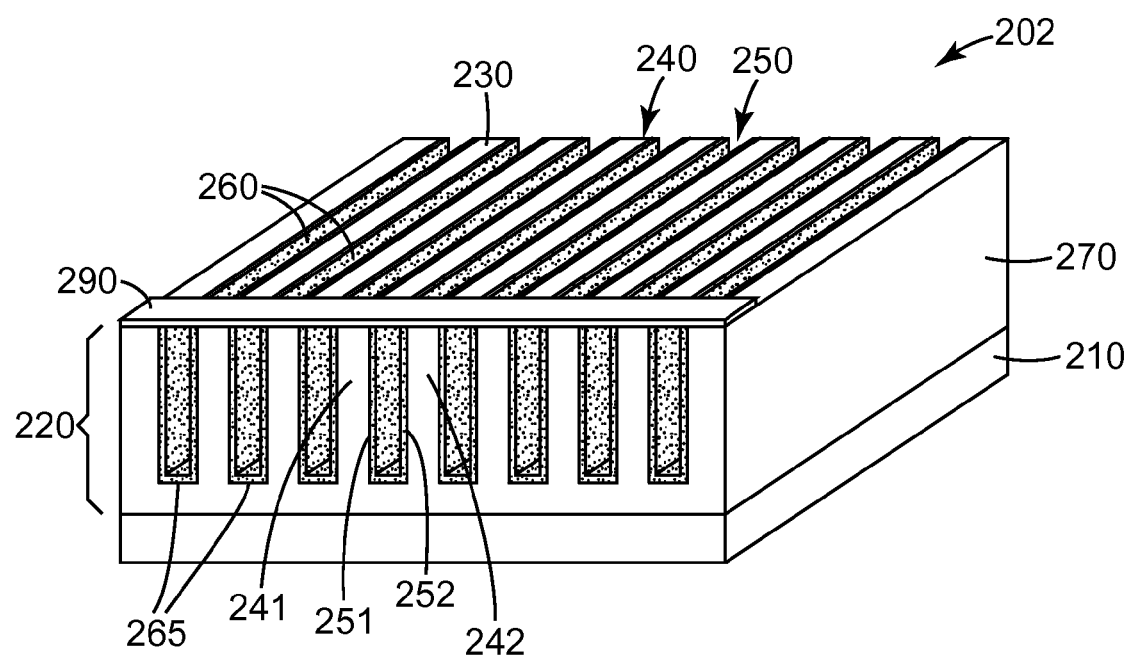

FIG. 2A shows a schematic cross-sectional view of an exemplary optical film 202 from which the electronically switchable privacy device can be made. Similar to optical film 102, optical film 202 is a transparent electrode layer, including transparent substrate layer 210 and optically transparent microstructured layer 220 disposed on transparent substrate layer 210. Transparent substrate layer 210 is typically a flexible layer, as defined by the ability to wrap substrate layer 210 around a cylindrical mandrel of 2.5 cm diameter without fracturing or cracking said layer. Optically transparent microstructured layer 220 comprises a plurality of microstructured ribs 240 extending across surface 230 of optically transparent microstructured layer 220. FIG. 2B shows another view of optical film 202 wherein microstructured ribs 240 extend across major surface 230 of the optically transparent microstructured layer 220 such that an alternating series of ribs 240 and channels 250 are formed. Each channel 250 has channel walls (e.g., 251, 252) defined by adjacent ribs (e.g., 241, 242).

Optical film 202 includes a plurality of transparent electrode members 260 comprising transparent electrode material disposed in corresponding plurality of channels 250. The transparent electrode members 260 each have a unitary construction including transparent electrode material disposed continuously on both of the channel walls (e.g., 251, 252) and across a channel floor (e.g., 265) defined by a portion of the transparent substrate layer 210 extending between adjacent ribs. An external side wall 270 is included for later reference (in FIG. 3).

In FIG. 2B, a "bus member" (or "bus bar") 290 is shown along an edge of optical film 202, disposed across the ribs and channels and, importantly, provides electrical connectivity across the plurality of transparent electrode members 260, so that the plurality of transparent electrode members 260 can function together as a single electrode in optical film 202. A similar bus bar could also be provided in optical film 102 shown in FIGS. 1A and 1B. Optical film 202 (or optical film 102) is useful as a microstructured transparent electrode layer in an electronically switchable privacy device.

Figure 3:
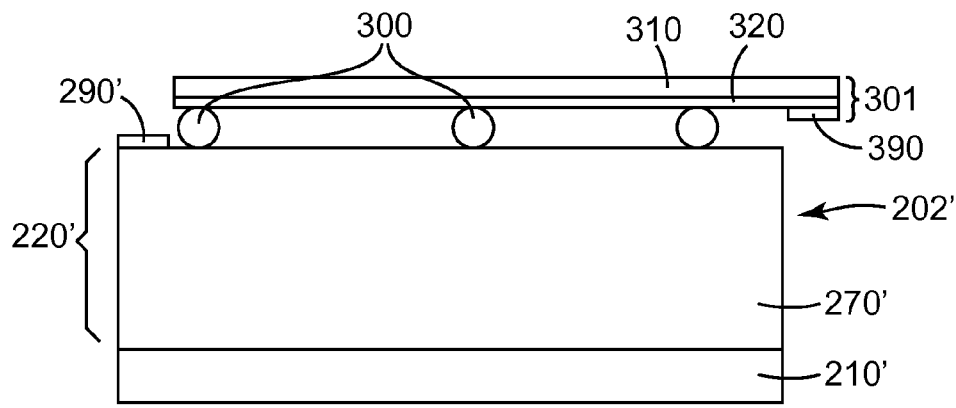
FIG. 3 shows a schematic side view of an exemplary electronically switchable privacy device of the present disclosure.

FIG. 3 shows a schematic side view of an exemplary electronically switchable privacy device 302 that includes optical film 202' (same as 202 in FIGS. 2A and 2B, but viewed from side 270'—corresponding to 270 in FIG. 2B). Electronically switchable privacy device 302 also comprises a "first" transparent electrode layer 301 including a first transparent substrate layer 310 and a first transparent electrically conductive layer 320 disposed on a major surface of the first transparent substrate layer. The first transparent electrode layer 301 is typically planar, does not contain engineered microstructure, and is also typically flexible. The first transparent electrode can typically function as an anode electrode in the electronically switchable privacy device. An electrically conductive strip 390 is shown disposed along an edge of first transparent electrode 301, which allows an ohmic contact to be made to this electrode. The electrically conductive layer 320 of first electrode layer 301 is disposed opposite optical film 202', which is also referred to as the "second" transparent electrode layer.

Figure 4A:
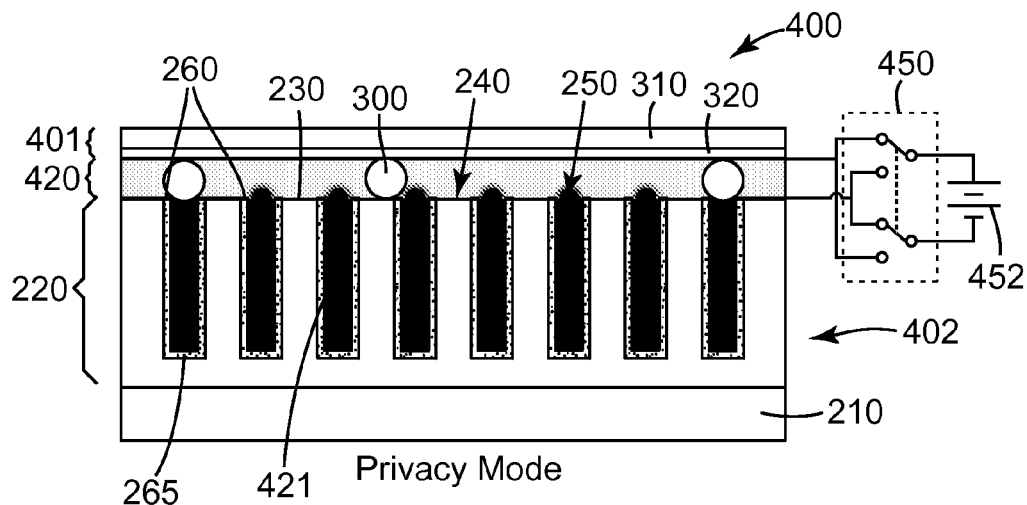
FIGS. 4A and 4B show schematic cross-sectional views of an exemplary electronically switchable privacy device illustrating electronic switchability of the film between privacy mode and share mode, respectively.
Figure 4B:
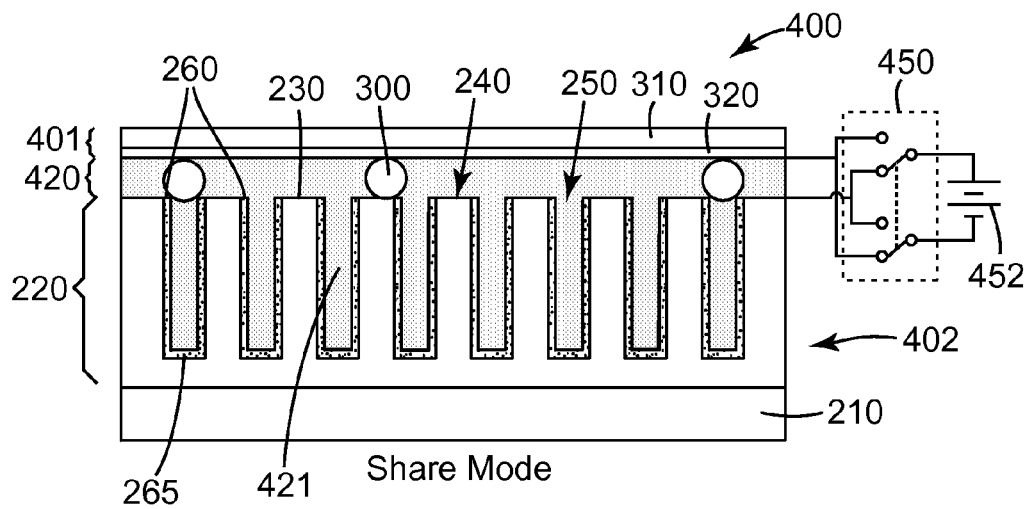

FIGS. 4A and 4B show schematic cross-sectional views of an exemplary electronically switchable privacy device illustrating electronic switchability of the film between privacy and share modes. Electronically switchable privacy device 400 comprises a pair of mutually opposing transparent electrodes 401 and 402 and electronically switchable material 420 disposed between the electrodes. Transparent electrode 402 includes optically transparent microstructured layer 220 that comprises a plurality of microstructured ribs 240 extending across a surface 230 of microstructured layer 220 such that an alternating series of ribs 240 and channels 250 comprising a plurality of electrode members 260 are formed. Plurality of electrode members 260 are electrically connected by bus bar 290 (not shown, see FIG. 2B). Electronically switchable material 421 is shown as disposed in channels 250, electronically switchable material 420 is disposed as a layer between mutually opposing transparent electrodes 401 and 402. Spacer elements 300 are provided to keep opposing transparent electrode layers 401 and 402 from coming into direct electrical contact with each other, which can result in an undesirable electrical short circuit and poor control of electronic switching properties. In some embodiments, spacer elements 300 are beads disposed in the layer of electronically switchable material 420, although other embodiments of spacer elements can be used, as also described herein. Preferably, the spacer elements are rigid, to ensure that opposing electrode layers 401 and 402 do not come into direct electrical contact with each other.

Electronically switchable materials 420 and 421 are typically both of the same electronically switchable starting material, but can behave differently due to different degrees of polymerization of the conjugated polymer in electronically switchable privacy device 400. In particular, electronically switchable material 421 disposed within channels 250 can be modulated between low and high light transmission states upon application of a negative or positive electric current across transparent electrodes 401 and 402. For the embodiment shown in FIGS. 4A and 4B, electronically switchable material 421 is shown schematically as being in a lower transmission state (dark shading, FIG. 4A) when a first direct current ("DC") voltage is applied, and in a high transmission state (light shading, FIG. 4B) when a second DC voltage is applied. The first and second DC voltages are with respect to an electrical ground. For privacy mode, the first DC voltage can be 0 volts, or a negative DC voltage having a minimum negative value of (−) 1.5 volt, (−) 1 volt, or even (−) 0.5 volts, or a negative DC voltage having a maximum negative value of (−) 2 volts, (−) 3 volts, or even (−) 4 volts. In some embodiments, for privacy mode the first DC voltage can have a value in a range from (−) 0.5 volt to (−) 4 volts, or from (−) 1 volt to (−) 3 volts, or even from (−) 1.5 volts to (−) 2 volts. For share mode, a second, positive DC voltage is applied, and the second DC voltage can have a minimum positive value of (+) 1.5 volt, or (+) 1 volt, or even (+) 0.5 volts, or a maximum positive value of (+) 2 volts, or (+) 3 volts, or even (+) 4 volts. In some embodiments, for share mode the second DC voltage can have a value in a range from (+) 0.5 volt to (+) 4 volts, or from (+) 1 volt to (+) 3 volts, or even from (+) 1.5 volts to (+) 2 volts. In a preferred embodiment the first and second DC voltages are approximately (−2) volts and (+) 2 volts, respectively. A DC voltage power supply 452 can provide the said DC voltages that can be switched in polarity (e.g., by double pole double throw switch 450) to achieve application of first and second DC voltages across transparent electrodes 401 and 402.

Figure 5A:
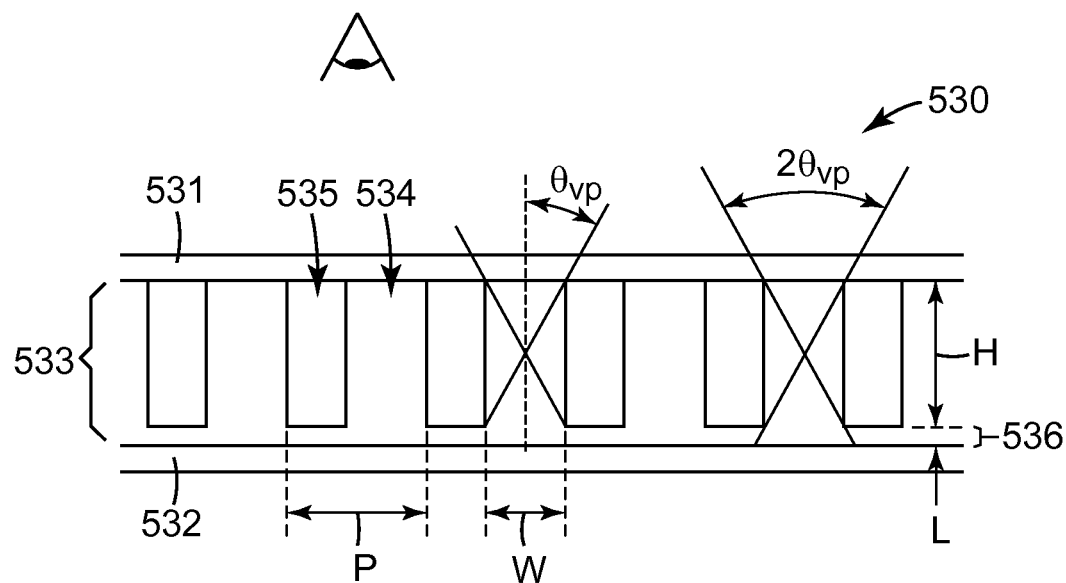
FIGS. 5A and 5B show schematic cross sectional views of an exemplary microstructured cathode film from which the electronically switchable privacy device can be made. Selected geometrical parameters illustrating viewing angle through the film are shown.
Figure 5B:
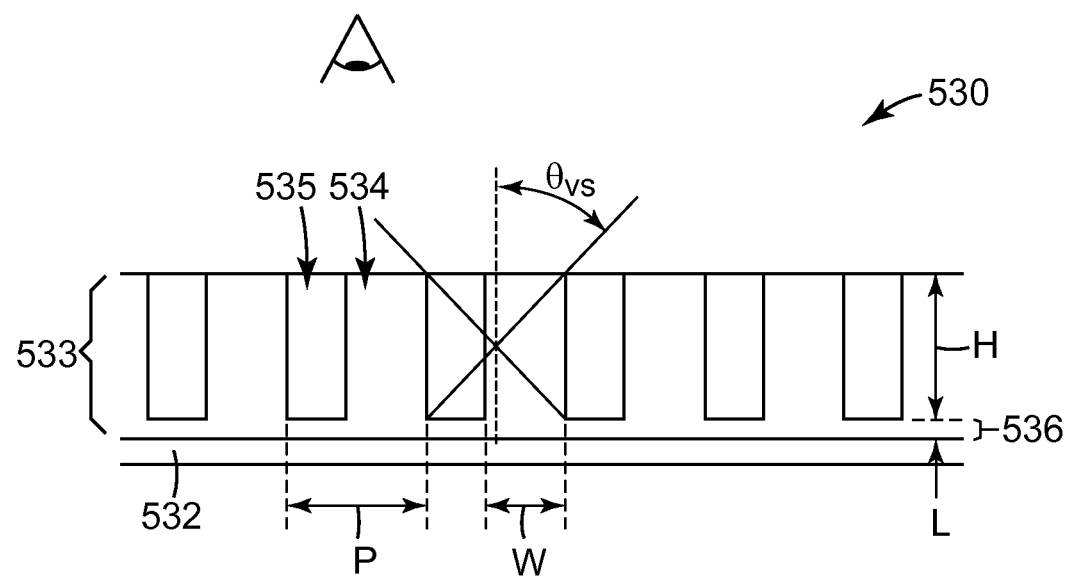

Geometrical parameters which influence optical performance of privacy devices have been described, for example, in U.S. Pat. No. 8,133,572 (Gaides et al.), incorporated herein by reference. Therefore, only a brief explanation of these parameters in the context of privacy device performance is provided. Geometrical parameters described herein are illustrated in FIGS. 5A and 5B. FIG. 5A shows a simplified schematic cross sectional view of an exemplary privacy device 530 comprising an optically transparent microstructured electrode layer 533 disposed on transparent substrate layer 532 and opposite "first" transparent electrode layer 531 (transparent electrode layer not shown). The optically transparent microstructured layer 533 comprises a plurality of microstructured ribs 534 extending across a surface of the layer (e.g., as also for optical film 102 in FIG. 1B). Channels 535 are formed between adjacent ribs and comprise transparent electrode material (not shown) and electrochromic material allowing for electronically switchable optical absorbance (not shown). Each rib/channel has height H, each rib has width W, and pitch P indicates the periodic spacing of the channels, as defined by the sum of the rib width W and a channel width. Width Y of the channels is P−W. A rib aspect ratio for layer 533 is defined as H/W, and a channel aspect ratio as H/Y. Optically transparent microstructured layer 533 also comprises land 536 having height L such that the thickness of layer 533 is H+L. Assuming channels 535 are filled with a material of relatively high optical absorbance, these geometric parameters determine privacy viewing angle ("$\theta_{vp}$"), in privacy mode.

Assuming channels 535 are filled with a material of relatively low optical absorbance, FIG. 5B shows an expanded, share viewing angle ("$\theta_{vs}$"), in share mode. Theoretically, the share viewing angle should extend to 180°, but in practice the share viewing angle is compromised by optical effects and distortions thought to be caused by light rays bouncing off a multitude of channel walls. The privacy viewing angle $\theta_{vp}$ should be substantially less (e.g., at least 20 degrees less) than the share viewing angle $\theta_{vs}$.

Parameters H, W, P, Y and L of the optically transparent microstructured layer can have any suitable values as long as the electronically switchable privacy device can function as desired. In general, dimensions of the microstructure are selected such that the desired viewing angle is provided by the film in privacy mode. At the same time, it is desirable for the parameters to be selected such that an adequate amount of light can pass through the film and toward the viewer situated normal to the viewing surface of the device. Given a fixed level of optical absorbance of the electrochromic material in privacy mode disposed inside the channels, smaller channel depth and width combined with a larger pitch may lead to increased on-axis light transmission, but may not absorb enough light off-axis for sufficient privacy. Larger channel depth and width combined with a smaller pitch may lead to sufficient off-axis privacy, but may also lead to decreased on-axis light transmission for the viewer situated normal to the viewing surface of the device.

In some embodiments, each rib has height H from about 10, 15, 20 or 25 to about 150 micrometers and width W from about 25 to about 50 micrometers. In some embodiments, rib aspect ratio H/W is greater than about 1.5, for example, greater than about 2.0, or greater than about 3.0. For example, each rib may have height H from about 25 to about 150 um and width W from about 25 to about 50 um such that rib aspect ratio H/W is greater than about 1.5.

In some embodiments, each channel has height H from about 25 to about 150 micrometers and width Y from about 1 to about 50 micrometers. In some embodiments, channel aspect ratio H/Y is greater than 3, 4, or 5. In some embodiments, the channel aspect ratio can be at least 6, 7, 8, 9, or 10. The channel aspect ratio is typically no greater than 50. When the channel aspect ratio is sufficiently high and the channels comprise a light absorbing material such as an electrochromic material switched into a privacy mode, the device exhibits low transmission (e.g. less than about 10%) at a viewing angle of 30° when a negative DC voltage is applied. In privacy mode, the transmission typically decreases as the viewing angle increases from 30° to 90°. Hence, when the privacy device exhibits low transmission (e.g. less than about 10%) at a viewing angle of 30°, the film also exhibits low transmission at viewing angles greater than 30°.

The height of the land (L) is typically minimized provided that the land is sufficiently thick such that it can mechanically support a large number of ribs, yet thin enough so that it does not interfere with the optical performance of the privacy device.

The microstructured ribs may have sides or channel walls that are substantially parallel to each other or they may be angled. In the privacy device shown in FIGS. 5A and 5B, the sides of the ribs are substantially parallel to each other. In other embodiments (not shown), each microstructured rib has angled walls, and each wall has wall angle $\theta_w$. The wall angle can be used to vary the viewing angle as described, for example, in U.S. Pat. No. 8,133,572 (Gaides et al.). In some embodiments, the wall angle is typically less than or equal to 6°.

The optically transparent microstructured layer is generally an optically transparent layer with desired light transmittance over a range of angles and wavelengths. Measured along a direction normal to the substrate, the optically transparent microstructured layer can have light transmittance from about 80% to about 100% over at least a portion of the visible light spectrum (about 400 to about 700 nm). In some embodiments, the optically transparent microstructured layer has a haze value from about 0.1% to less than about 5%. In some embodiments, the optically clear microstructured layer exhibits light transmittance from about 80% to about 100% and a haze value from about 0.1% to less than about 5%.

In some embodiments, the optically clear microstructured layer has a refractive index (sodium D line) from about 1.48 to about 1.75, or even from about 1.48 to about 1.51.

The substrate layer (e.g., 110 or 210) is a support substrate that provides mechanical support for the microreplicated features disposed on top of it. The transparent substrate can comprise any useful material such as, for example, polymer, glass, ceramic, metal, metal oxide, or a combination thereof. Depending on particular applications, the substrate layer may be rigid, semi-rigid, or flexible/conformable. Suitable materials for the substrate layer may be rigid, semi-rigid, or flexible polymeric materials such as thermoplastic materials (e.g., polyolefins and polyethylene terephthalates). Examples of polymers that may be used as the transparent substrate include thermoplastic polymers such as polyolefins, poly(meth)acrylates, polyamides, polyimides, polycarbonates, polyesters, polyethylene, polypropylene, polystyrene, poly(methylmethacrylate), bisphenol A polycarbonate, poly(vinyl chloride), poly(ethylene naphthalate), cellulose acetates and poly(vinylidene fluoride). Some of these polymers also have optical properties (e.g., transparency) that make them especially well-suited for certain display applications wherein they would support a patterned conductor, such as polycarbonates, Particularly suitable materials include thermoplastic materials that are flexible and optically transparent as thin layers, When a flexible substrate is used, the film may be wound up and provided as a roll, thereby enabling production using continuous roll-to-roll processes. The transparent substrate may have any useful thickness, ranging from about 5 micrometers to about 1000 micrometers. Additionally, the substrate may be primed or treated to promote adhesion to the polymerizable precursor material (e.g., acrylic priming, plasma and corona treatments).

Although the substrate layer (e.g., 110 or 210) is shown as a single layer, this layer may be a unified stack comprising many different layers. The different layers may provide a variety of optical enhancement properties, such as anti-glare, anti-fog, light polarization, anti-reflective, reflective and any combinations thereof.

The optically transparent microstructured layer (e.g., 120 or 220) can comprise any material as long as the desired properties of the optically transparent layer are obtained. Typically, the optically transparent microstructured layer is generally made from a polymerizable composition comprising polymers having number average molecular weights of about 1,000 or less (e.g., oligomers and macromonomers). Particularly suitable polymers or oligomers have molecular weights of about 500 or less, and even more particularly suitable polymerizable molecules have molecular weights of about 200 or less. Said polymerizable compositions are typically cured using actinic radiation, e.g., visible light, ultraviolet radiation, electron beam radiation, heat and combinations thereof, or any of a variety of conventional anionic, cationic, free radical or other polymerization techniques, which can be photochemically or thermally initiated.

Useful polymerizable compositions comprise curable functional groups known in the art, such as epoxide groups, allyloxy groups, (meth)acrylate groups, (meth)acrylamide groups, epoxide, episulfide, vinyl, hydroxyl, cyanoester, acetoxy, thiol, silanol, carboxylic acid, amino, phenolic, aldehyde, alkyl halide, cinnamate, azide, aziridine, alkene, carbamates, imide, amide, alkyne, ethylenically unsaturated groups, vinyl ether groups, and any derivatives and any chemically compatible combinations thereof.

The polymerizable composition used to prepare the optically clear microstructured layer may be monofunctional or multifunctional (e.g, di-, tri-, and tetra-) in terms of radiation curable moieties. Examples of suitable monofunctional polymerizable precursors include styrene, alpha-methylstyrene, substituted styrene, vinyl esters, vinyl ethers, N-vinyl-2-pyrrolidone, (meth)acrylamide, N-substituted (meth)acrylamides, octyl (meth)acrylate, nonylphenol ethoxylate (meth)acrylate, isobornyl (meth)acrylate, isononyl (meth)acrylate, 2-(2-ethoxyethoxy)ethyl (meth)acrylate, 2-ethylhexyl (meth)acrylate, lauryl (meth)acrylate, beta-carboxyethyl (meth)acrylate, isobutyl (meth)acrylate, cycloaliphatic epoxide, alpha-epoxide, 2-hydroxyethyl (meth)acrylate, (meth)acrylonitrile, maleic anhydride, itaconic acid, isodecyl (meth)acrylate, dodecyl (meth)acrylate, n-butyl (meth)acrylate, methyl (meth)acrylate, hexyl (meth)acrylate, (meth)acrylic acid, N-vinylcaprolactam, stearyl (meth)acrylate, hydroxyl functional caprolactone ester (meth)acrylate, isooctyl (meth)acrylate, hydroxyethyl (meth)acrylate, hydroxypropyl (meth)acrylate, hydroxyisopropyl (meth) acrylate, hydroxybutyl (meth)acrylate, hydroxyisobutyl (meth)acrylate, tetrahydrofuryl (meth)acrylate, and any combinations thereof.

Examples of suitable multifunctional polymerizable precursors include ethyl glycol di(meth)acrylate, hexanediol di(meth)acrylate, triethylene glycol di(meth)acrylate, tetraethylene glycol di(meth)acrylate, trimethylolpropane tri (meth)acrylate, ethoxylated trimethylolpropanepropane tri (meth)acrylate, glycerol tri(meth)acrylate, pentaerythritol tri(meth)acrylate, pentaerythritol tetra(meth)acrylate, neopentyl glycol di(meth)acrylate, and any combinations thereof.

Other molecular species may be involved in network formation as well, such as crosslinker molecules containing two or more functional groups known in the art to be reactive with the previously mentioned molecular species. In addition to the polymerizable precursors, the cross-linked matrix may also include one or more non-curable materials, such as non-curable polyurethanes, acrylic material, polyesters, polyimides, polyamides, epoxies, polystyrene (e.g., substituted polystyrene containing materials), silicone containing materials, fluorinated materials, and any combinations thereof.

Examples of suitable radiation-curable oligomers for the polymerizable composition include oligomers based on urethane and polyester chemistries, as for example described in U.S. Pat. No. 6,398,370 (Chiu et al.), U.S. Published Patent Application No. 2010/0201242 (Liu et al.), U.S. Pat. No. 8,133,572 (Gaides et al.) and U.S. Pat. No. 8,012,567 (Gaides et al.). Examples of commercially available (meth) acrylated urethanes and polyesters include oligomers commercially available under the trade designation "PHOTOMER" from Cognis (Ambler, Pa.); oligomers commercially available under the trade designation "EBECRYL" from UCB Radcure Inc., Smyrna, Ga.; and oligomers commercially available under the trade designation "SARTOMER CN" from Sartomer Co, Exton, Pa.

The polymerization reactions generally lead to the formation of a three-dimensional "crosslinked" macromolecular network and are also known in the art as negative-tone photoresists, as reviewed by Shaw et al., "Negative photoresists for optical lithography," IBM Journal of Research and Development (1997) 41, 81-94. The formation of the network may occur through either covalent, ionic, or hydrogen bonding, or through physical crosslinking mechanisms such as chain entanglement. The reactions can also be initiated through one or more intermediate species, such as free-radical generating photoinitiators, photosensitizers, photoacid generators, photobase generators, or thermal acid generators. The type of curing agent used depends on the polymerizable precursor used and on the wavelength of the radiation used to cure the polymerizable precursor. Examples of suitable commercially available free-radical generating photoinitiators include benzophenone, benzoin ether, and acylphosphine photoinitiators, such as those sold under the trade designations "IRGACURE" and "DAROCUR" from Ciba Specialty Chemicals, Tarrytown, N.Y. Other exemplary photoinitiators include benzophenone, 2,2-dimethoxy-2-phenylacetophenone (DMPAP), 2,2-dimethoxyacetophenone (DMAP), xanthone, and thioxanthone.

Co-initiators and amine synergists may also be included to improve curing rates. Suitable concentrations of the curing agent in the crosslinking matrix range from about 1 wt. % to about 10 wt. %, with particularly suitable concentrations ranging from about 1 wt. % to about 5 wt. %, based on the entire weight of the polymerizable precursor. The polymerizable precursor may also include optional additives, such as heat stabilizers, ultraviolet light stabilizers, free-radical scavengers, and combinations thereof. Examples of suitable commercially available ultraviolet light stabilizers include benzophenone-type ultraviolet absorbers, which are available under the trade designation "UVINOL 400" from BASF Corp., Parsippany, N.J.; under the trade designation "CYASORB UV-1164" from Cytec Industries, West Patterson, N.J.; and under the trade designations "TINUVIN 900," "TINUVIN 123" and "TINUVIN 1130" from Ciba Specialty chemicals, Tarrytown, N.Y. Examples of suitable concentrations of ultraviolet light stabilizers in the polymerizable precursor range from about 0.1 wt. % to about 10 wt. %, with particularly suitable total concentrations ranging from about 1 wt. % to about 5 wt. %, relative to the entire weight of the polymerizable precursor.

Examples of suitable free-radical scavengers include hindered amine light stabilizer (HALS) compounds, hydroxylamines, sterically hindered phenols, and combinations thereof. Examples of suitable commercially available HALS compounds include the trade designated "TINUVIN 292" from Ciba Specialty Chemicals, Tarrytown, N.Y., and the trade designated "CYASORB UV-24" from Cytec Industries, West Patterson, N.J. Examples of suitable concentrations of free radical scavengers in the polymerizable precursor range from about 0.05 wt. % to about 0.25 wt. %.

The optical film shown in FIG. 2A can be made using a coating process as described, for example, in U.S. Pat. No. 4,766,023 (Lu et al). In this process, a transparent substrate layer is coated with an acrylic monomer composition described, for example, in Example 4 of U.S. Pat. No. 8,012,567 (Gaides et al.). The composition is polymerized with high intensity UV radiation while pressed against a cylindrical copper tool roll embossed with a microstructured pattern which is inverse to the desired microstructured pattern illustrated in FIGS. 1A and 2A (see layers 120 and 220). The cured composition in the form of a microstructured layer is released from the tool. Release can be facilitated by use of a release agent coated on the surface of the copper tool which produces a low surface energy surface. Suitable release agents may include polytetrafluoroethylene (PTFE) or other semifluorinated coatings, silicone coatings, and the like. The release agents may be applied by either solution or vapor-phase treatment of the metal tool. Release can also be facilitated by suitable design of the channels as described, for example, in U.S. Pat. No. 6,398,370 (Chiu et al.) wherein the channel walls are angled at a few degrees relative to the surface normal.

The particular combination of monomers used to form the cured polymeric layer may be selected such that the modulus of the layer is low enough to enable release from the tool, but with enough cohesive strength not to break during roll to roll processing. If the cured polymeric layer is too soft, it will cohesively fail, but if it is too brittle, it will fracture or not pull out of the tool. The combination of monomers may be selected such that the cured polymeric layer sufficiently adheres to the substrate on which it is formed.

The electronic stimulus that enables switching for the privacy film disclosed herein originates from the pair of opposing transparent electrodes. The transparent electrodes are substantially optically clear such that when viewing an object through the transparent electrodes, little or no distortion of the object is observed, or some acceptable level of distortion is observed. In some embodiments, a suitable transparent electrode exhibits little or no haze, meaning it may have a haze value not greater than about 10%, not greater than about 5% or not greater than about 2%. In some embodiments, the transparent substrate has high light transmittance of from about 80% to about 100% over at least a portion of the visible light spectrum (about 400 to about 700 nm).

In order to form a transparent electrode on top of the high aspect ratio microstructured resin, a suitable transparent conducting material is required. The transparent conducting material may be deposited onto the microstructured resin via a coating method which would be compatible with a continuous process using roll-to-roll processing, such as a vapor deposition method. In a preferred embodiment, the transparent electrode is coated using solution coating methods.

Vapor-phase coating of conducting polymers is one way to conformally coat conducting polymer on high aspect ratio microreplicated resin. Physical vapor deposition methods include evaporation or sputtering methods, and methods in which transparent conductive oxides are deposited are well known in the art. Using physical vapor deposition methods, it is difficult to yield continuous coatings on high-aspect ratio microstructures due to the shadowing effects originating from the microreplicated rib structures. Typically, these methods preferentially form a build-up of material on the tops of the channels, which may block deposition of material at the bottom of the channel. Only species that are directed perpendicular to the bottom of the channel may deposit on the bottom of the channel, and the likelihood of this happening decreases with higher aspect ratio structures. An example of the use of sputtered indium tin oxide on high aspect ratio structures patterned via photolithography is purportedly described in International (PCT) Published Patent Application No. WO 2011/132992 (Kim et al.), where the sputtered ITO layer served as electrodes for an inorganic electrochromic system, and described its use as a privacy filter. In another example of vapor deposition, U.S. Pat. No. 7,618,680 (Gleason et al.) purportedly describes the deposition of poly(3,4-ethylenedioxythiophene) onto high surface-area substrates via chemical vapor deposition techniques, where the described technique required volatilization of 3,4-ethylenedioxythiophene monomer into a vapor, along with controlled mixing with a vaporized oxidant species, such as iron chloride ($Fe(III)Cl_3$) via an argon inert carrier gas.

For solution-based coating methods, the solution must also be able to wet out the surface of the resin, and to leave behind a layer of continuous layer of transparent conductor on the resin after drying. Metallic nanowires are not desirable in these embodiments because of the inability of the high aspect ratio nanowires to penetrate into the small crevices of the microstructured resin. Furthermore, the likelihood that they will form a conducting network on nearly vertical channel walls is small. Preferably, a uniform conducting polymer dispersion is used that does not show anisotropy in either its optical or electrical conductivity properties. A preferred conducting polymer is known as poly(3,4-ethylenedioxythiophene), and will be referred to as "PEDOT" from this point on. Similar to other conducting polymers, PEDOT is not soluble in its native state because of its highly rigid molecular structure, which is required to maintain electron orbital overlap along the backbone of the polymer chain. Researchers have found a way disperse PEDOT into water by blending it with a water soluble polyanion, poly(styrene sulfonic acid) ("PSS") as a charge-balancing dopant for PEDOT. Aqueous formulations of PEDOT:PSS (usually between 1-2 wt. % PEDOT:PSS in water) are available from several companies, such as Heraeus Precious Metals (Leverkusen, Germany, under the trade designation "CLEVIOS PH1000"), and Agfa-Gevaert NV (Mortsel, Belgium, under the trade name "ORGACON"), among others. When coated and dried, these dispersions can provide coatings with conductivities ranging from 10 S/cm up to 1000 S/cm. Thicker coatings (of several microns) are known to exhibit higher conductivities than thinner coatings (under a micron). It is known in the art that dopants, such as dimethyl sulfoxide or ethylene glycol, can be added into these formulations to enhance their conductivity, but the exact mechanism behind this phenomenon has not been confirmed.

Other ways are possible to enable the dispersion or solubilization of conducting polymers in organic solvents, such as functionalizing the conducting polymers with pendant side groups. Many reports describing chemical functionalization of conducting polymers are available in the literature, for example in Amb et al., Adv. Mater. 2010, 22, 724. The chemical functionalization of the conducting polymer has been shown to result in shifts in the absorption properties of the materials, so this must be taken into account when designing optical materials.

Once the conducting polymer is dissolved or dispersed, it can be deposited onto the microreplicated resin substrate via conventional methods such as dip coating, spin coating, doctor blade coating, ink jet printing, flexographic printing, gravure printing, screen printing, spray coating, brush coating, curtain casting, drop casting, and the like.

The adhesion of the conducting polymer may be enhanced by the use chemical primers that bond with the substrate, or treatment of the substrate with a reactive plasma or corona, which introduces additional chemical functionality on the surface of the resin. Reactive plasma gases such as oxygen, nitrogen, air or fluorocarbon gases are known in the art and may be used.

Other soluble conductors that can be deposited via solution coating methods onto high-aspect ratio microstrutures include conducting polymers such as poly(thiophene), poly (aniline), poly(pyrrole), poly(furan), poly(acetylene), poly (phenylene), poly(phenylene-vinylene), poly(fluorene), poly (azepine), poly(p-phenylene sulfide), poly(naphthalene), poly(azulene), poly(indole), poly(carbazole), and many derivatives or combinations of the same. Other conductive materials may be used as well, including formulations including nanoparticles of transparent conductive oxides. Transparent conductive oxides include but are not limited to indium tin oxide (ITO), indium-doped zinc oxide, and fluorine-doped tin oxide. Colloidal dispersions of silver, nanocarbons (e.g., carbon nanotubes, carbon black or graphene), or any combinations thereof may also be possible.

In some embodiments, the conductive layer is disposed in some discontinuous form across a microstructured surface of the transparent substrate, forming a pattern comprising transparent conductive regions and transparent non-conductive regions. Patterning techniques known in the art may be used to create said patterns, such as photolithography, microcontact printing, electron beam lithography, and the like. These patterning techniques may or may not be used in combination with etching techniques such as reactive ion etching to remove exposed conductive materials. Preferably, plasma etching may be used to remove transparent conductor formed on the top and bottom horizontal surface of the channels shown in FIGS. 1A and 2A. In a preferred embodiment, PEDOT:PSS dispersion is coated onto the microreplicated structure and allowed to wick into the microchannels via capillary action. Then, excess material is cleared from the tops of the channels via a doctor blade, or an absorbent cleanroom wipe. After drying, preferably at temperatures above the boiling point of water, the dried PEDOT:PSS layer conformally and continuously coats the inside of the microchannel surface, including both channel walls and the bottom surface, as shown in FIG. 2, to form a microstructured electrode surface. In some embodiments, the microstructured electrode surface so formed can have a sheet resistance value in a range from 50 to 400 ohms per square. Sheet resistance value can be measured with a non-contact type of device, for example, the conductance monitor available from Delcom Instruments, Inc. (Minneapolis, Minn.), under the trade designation "707 BENCH-TOP MONITOR".

Traditional methods of manufacturing electrochromic devices involve energizing opposing electrodes inside an electrolyte bath, which also includes a solubilized electroactive monomer. The electroactive monomer electrochemically polymerizes on the electrode surface in order to form a continuous layer. Afterwards, the electrolyte bath must be disposed of. Another method of making an electrochromic cell is taught in U.S Published Patent Application No. US2011/0233532 (Sotzing et. al). This method involves the formation of a semi-interpenetrating network of the electrochromic polymer species and a radiation-curable electrolyte composition. This in-situ method of electrochromic deposition does not involve removal of the electrolyte, because the electrolyte, once crosslinked, becomes an integral part of the device construction. Charge can flow continuously between the two opposing electrodes through the crosslinked electrolyte to electrochemically polymerize the electroactive monomer, to form an electrochromic polymer. The application of a sufficient voltage causes diffusive migration of the electroactive monomer towards the surface of the working electrode, thereby forming a composite structure comprising the gel electrolyte and conjugated electrochromic polymer. In the case of PEDOT, the working electrode is the cathode, so a positive voltage is applied on the transparent electrode that is formed on the microstructured resin, in order to take full advantage of the optical effects previously discussed. Once formed, these electrochromic cells function similar to other electrochromic systems, in that charges of opposite polarity can cause color-switching with surprisingly high photopic contrast. Using a similar electrochromic cell production method with planar electrodes, the authors in Ding et. al (J. Mater. Chem., 2011, 21, 11873) describe photopic contrasts of ~45%, which is similar to the photopic contrast of devices made via the traditional method (using electrolyte baths) described above.

The electroactive composition in use in this method contains components which are similar to those that are known in the art of electrochromic solid-state devices. In preferred embodiments, the electroactive composition comprises a polymerizable precursor material, an ionic salt compound, a plasticizing solvent, an electroactive monomer and a rigid spacer element. One skilled in the art would appreciate that varying amounts and types of these components will produce different device performance, and these will be discussed briefly herein. These components should be compatible with each other such that their combination does not cause significant phase separation. One skilled in the art may appreciate that various forms of mixing, such as magnetic stirring, ultrasonication, or mechanical methods may be used to keep this mixture homogenously distributed. This electroactive composition will be spread over the previously discussed microstructured transparent electrode, such that the composition completely fills the microstructure and is in intimate contact with the transparent electrode.

Thus, the components in the electroactive composition should adhere to, but not substantially affect the normal function of the second transparent electrode and microstructured resin component.

The polymerizable precursor for the gel electrolyte is generally made from a polymerizable composition comprising polymers having number average molecular weights of about 1,000 or less (e.g., oligomers and macromonomers). Particularly suitable pre-polymers or oligomers have number average molecular weights of about 500 or less, and even more particularly suitable polymerizable pre-polymers or oligomers have molecular weights of about 200 or less. Said polymerizable compositions are typically cured using actinic radiation, e.g., visible light, ultraviolet radiation, electron beam radiation, heat and combinations thereof, or any of a variety of conventional anionic, cationic, free radical or other polymerization techniques, which can be photochemically or thermally initiated.

Useful polymerizable compositions in the gel electrolyte may comprise curable functional groups known in the art, such as epoxide groups, allyloxy groups, (meth)acrylate groups, (meth)acrylamide groups, episulfide, vinyl, hydroxyl, cyanoester, acetoxy, thiol, silanol, carboxylic acid, amino, phenolic, aldehyde, alkyl halide, cinnamate, azide, aziridine, alkene, carbamates, imide, amide, alkyne, ethylenically unsaturated groups, vinyl ether groups, and any derivatives and any combinations thereof. Polymers such as poly(methyl methacrylate), poly(vinyl butyral), poly(acrylic acid), poly(vinyl alcohol), and others may be used. Preferably, the polymerizable precursor contains functionalities that are known to complex with the abovementioned ionic salt component of the electrolyte. Exemplary polymers include poly(ether) varieties, such as poly(alkylene ethers) poly(alkylene glycol)s comprising ethyleneoxy propylenoxy, and butyleneoxy repeating units. Specific polymers that are preferred are poly(ethylene glycol) diacrylate, poly(propylene glycol) diacrylate, poly(butylene glycol) diacrylate, and combinations thereof. The crosslinkable polymer can also be a random, star or block copolymer.

The polymerizable precursor in the gel electrolyte have polymerizable molecules with different functionalities, such as monofunctional, difunctional, trifunctional, tetrafunctional, and pentafunctional functionalities. The gel electrolyte may or may not also have monomeric components that can crosslink into the network. In one embodiment, between 1 wt. % and 10 wt. % of a total weight of the gel electrolyte is a monomeric component. In another embodiment, between 2.5 wt. % and 7.5 wt. % of a monomeric component is used. In a preferred embodiment, ethylene glycol diacrylate is used as the monomeric component of the gel. In some embodiments it was found that adding a small amount of EGDA (e.g., 5 wt. % relative to a total weight of the gel electrolyte) was helpful for manufacturing tablet-sized prototype devices. For making small (e.g., business-card) sized devices, it was possible to make devices without the EGDA crosslinker, as shown in FIGS. 7A to 7D.

The crosslinkable polymer may also have diluent polymers that do not participate in the crosslinking reaction, as long as these constituents do not adversely affect the desired properties of the material. Said properties may include, for example, ionic conductivity of the gel electrolyte, switching speed of the electrochromic response, color contrast of the electrochromic response, adhesion of the gel electrolyte to the substrate, or flexibility of the device. Exemplary diluents polymers may include poly(ethylene oxide), poly(ethylene glycol), poly(vinyl alcohol), poly(acrylic acid), or any combinations thereof. In another embodiment, the crosslinkable polymer may not include diluent polymers.

The polymerizable precursor for the gel electrolyte may or may not also include optional additives, such as heat stabilizers, ultraviolet light stabilizers, free-radical scavengers, and combinations thereof. Examples of suitable commercially available ultraviolet light stabilizers include benzophenone-type ultraviolet absorbers, which are available under the trade designation "UVINOL 400" from BASF Corp., Parsippany, N.J.; under the trade designation "CYASORB UV-1164" from Cytec Industries, West Patterson, N.J.; and under the trade designations "TINUVIN 900," "TINUVIN 123" and "TINUVIN 1130" from Ciba Specialty chemicals, Tarrytown, N.Y. Examples of suitable concentrations of ultraviolet light stabilizers in the polymerizable precursor range from about 0.1 wt. % to about 10 wt. %, with particularly suitable total concentrations ranging from about 1 wt. % to about 5 wt. %, relative to the entire weight of the polymerizable precursor.

Examples of suitable free-radical scavengers include hindered amine light stabilizer (HALS) compounds, hydroxylamines, sterically hindered phenols, and combinations thereof. Examples of suitable commercially available HALS compounds include the trade designated "TINUVIN 292" from Ciba Specialty Chemicals, Tarrytown, N.Y., and the trade designated "CYASORB UV-24" from Cytec Industries, West Patterson, N.J. Examples of suitable concentrations of free radical scavengers in the polymerizable precursor range from about 0.05 wt. % to about 0.25 wt. % of the precursor solution.

The electroactive composition can also comprise a solvent or plasticizer to enhance the ionic conductivity of the gel electrolyte contained within it. This plasticizer must not swell, dissolve, or otherwise damage the structure of the microreplicated resin substrate or the transparent electrode disposed on top of said substrate. These may be high boiling organic liquids like dimethylformamide (DMF) or triglyme. In particular the solvent can be a carbonate, for example alkylene and alkylyne carbonates such as dimethyl carbonates, ethylmethyl carbonate, methylpropyl carbonate, methylbuyl carbonates, methylpentyl carbonates, diethylcarbonate, ethylpropyl carbonate, ethylbutyl carbonate, dipropyl carbonate, propylene carbonate, ethylene carbonate, and combinations thereof. The amount of solvent and/or plasticizer added to the gel electrolyte precursor mixture can range from about 0 wt. % to about 50 wt. % of the gel precursor mixture, specifically about 10 wt. % to about 40 wt. %, and more specifically about 20 wt. % to 30 wt. % of the gel electrolyte precursor mixture.

The electrolyte composition can comprise an alkali metal ion of Li, Na, or K. Exemplary electrolytes, where M represents an alkali metal ion, include $MClO_4$, $MPF_6$, $MBF_4$, $MAsF_6$, $MSbF_6$, $MCF_3SO_3$, $MCF_3CO_2$, $M_2C_2F_4(SO_3)_2$, $MN(CF_3SO_2)_2$, $MN(C_2F_5SO_2)_2$, $MC(CF_3SO_2)_3$, $MN(R_fOSO_2)_2$ (wherein $R_f$ is a fluoroalkyl group), MOH, or combinations of the foregoing electrolytes. In particular, the electrolyte composition comprises a lithium salt. More particularly, the lithium salt is lithium trifluoromethanesulfonate (lithium triflate). Other suitable salts include tetra-n-butylammonium tetrafluoroborate ($TBABF_4$); tetra-n-butylammonium hexafluorophosphate ($TBAPF_6$); and combinations thereof. When a gel electrolyte is used, the concentration of the electrolyte salt may be about 0.01 wt. % to about 30 wt. % of the gel electrolyte precursor, specifically about 5 wt. % to about 20 wt. %, and yet more specifically about 10 wt. % to about 15 wt. % of the gel electrolyte precursor.

The electrolyte composition may be cured via photochemical or thermal methods. In a preferred embodiment, the electrolyte composition is cured via actinic irradiation using a photoinitiator. Exemplary photoinitiators include benzophenone, 2,2-dimethoxy-2-phenylacetophenone (DMPAP), dimethoxyacetophenone, xanthone, and thioxanthone. In one preferred embodiment the initiator include 2,2-dimethoxy-2-phenyl-acetophenone (DMPAP), and irradiation is performed using 365 nm irradiation. Crosslinking may also be carried out using heat. Heating temperatures between 40° C. and 70° C. may be used using a thermal initiator. Exemplary thermal initiators include peroxide initiators such as benzoyl peroxide or dicumyl peroxide. Alternatively, azobisisobutyronitrile (AIBN) and its derivatives may be used as a thermal initiator. Thermal and actinic radiation sources may also be used in combination using a combination of photo and thermal initiators.

Other exemplary gel polymer electrolytes include those described in U.S. Pat. No. 7,586,663 (Radmard et al.) and U.S. Pat. No. 7,626,748 (Radmard et al.), and Abbrent et al., "Gel electrolytes prepared from oligo(ethylene glycol) dimethacrylate: glass transition, conductivity and Li+ coordination," Electrochimica Acta, Vol. 43, (1998) Nos. 10-11, pp. 1185-1191.

As mentioned previously, an electroactive monomer is also a component of the electroactive composition. This material should ideally be soluble in the polymerizable precursor formulation in order to produce a homogenous solution. In a preferred embodiment, the electroactive monomer is an organic molecule, which can be electrochemically polymerized into a conjugated polymer. "Conjugated" means that the polymer comprises an alternating series of double and single bonds which form an overlapping series of p-orbitals with delocalized electrons. These electrons are not confined to a single bond or atom, instead they can move freely on a group of atoms. As such, these systems exhibit electronic behaviors that are similar to that of a metal and follow well-known electronic conduction theory. The difference in energy between the highest occupied molecular orbital for an electron (the valence band) and the lowest unoccupied molecular orbital for an electron (the conduction band) defines an optical bandgap ($E_g$) for these materials. Depending on the magnitude of this bandgap, the absorption properties of the electrochromic materials may change substantially. Cathodically coloring materials have a band gap less than or equal to 2.0 eV in the neutral state. A cathodically coloring material changes color when oxidized (p-doped). The change in visible color can be from colored in the neutral state to colorless in the oxidized state, or from one color in the neutral state to another different color in the oxidized state. Herein, "colored" means the material absorbs one or more radiation wavelengths in the visible region (400 nm to 700 nm) in sufficient quantity that the reflected or transmitted visible light by the material is visually detected by the human eye as a color (red, green, blue, or a combination thereof). Cathodically coloring materials include, but are not limited to polymers derived from a 3,4-alkylenedioxyheterocycle such as an alkylenedioxypyrrole, alkylenedioxythiophene or alkylenedioxyfuran. These further include polymers derived from 3,4-alkylenedioxyheterocycles comprising a bridge-alkyl substituted 3,4-alkylenedioxythiophene, such as 3,4-(2,2-dimethylpropylene)dioxythiophene (ProDOT-(Me)$_2$), 3,4-(2,2-dihexylpropylene) dioxythiophene (ProDOT-(hexyl)$_2$), or 3,4-(2,2-bis(2-ethylhexyl)propylene) dioxythiophene (ProDOT-(ethylhexyl)$_2$).

An anodically coloring material has a band gap greater than 3.0 eV in its neutral state. An anodically coloring material changes color when reduced (n-doped). The material can be colored in the neutral state and colorless in reduced state, or have one color in the neutral state and a different color in the reduced state. An anodically coloring material can also comprise polymers derived from a 3,4-alkylenedioxyheterocycle or derived from an alkylenedioxyheterocycle such as alkylenedioxypyrrole, alkylenedioxythiophene or alkylenedioxyfuran. Exemplary 3,4-alkylenedioxyheterocycle monomers to prepare anodically coloring polymers include an N-alkyl substituted 3,4-alkylenedioxypyrrole, such as N-propyl-3,4-propylenedioxypyrrole (N-Pr Pro-DOP), N-Gly-3,4-propylenedioxypyrrole (N-Gly ProDOP), where N-Gly designates a glycinamide adduct of pyrrole group, or N-propane sulfonated ProDOP (ProDOP-NPrS). Polymers with intermediate bandgaps ($2<E_g<3$) can switch between different colors within the wavelength of visible radiation upon oxidation and reduction.

The electroactive monomers selected for incorporation into the curable gel electrolyte may include one or more cathodically coloring materials, one or more anodically coloring materials, or a combination thereof. Typically, between 0.1 wt. % and 50 wt. % of the composition comprises the electroactive monomer. Typically, a higher concentration of electroactive monomer in the electroactive composition leads to a higher photopic contrast of the switching system.

Other examples of organic electroactive monomers are those that are known in the art to exhibit electroactivity when polymerized, including but not limited to surface-bound viologen dyes, phenothiazine, diarylethene, and conducting polymers such as thiophene, 3,4-ethylenedioxythiophene, aniline, pyrrole, furan, fluorene, pyrene, azulene, indole, carbazole, acetylene, phenylene, phenylene vinylene, p-phenylene sulfide, azepine, naphthalene, biphenyl, terphenyl and many substituted derivatives or combinations of the same. In a preferred embodiment, 3,4-ethylenedioxythiophene (EDOT) is used, which produces poly (3,4-ethylenedioxythiophene) when it is polymerized.

Electrochromic systems that are also responsive to certain wavelengths of light are also known, which materials can switch between a clear state and a highly colored state upon exposure to UV radiation, then be switched back to the clear state by application of an electric field, such as in U.S. Published Patent Application No. 2010/0315693 (Lam et al). Other suitable electrochromic systems are described in U.S. Published Patent Application No. 2011/0233532 (Sotzing et al.).

Included in the electroactive monomer composition is a dispersed rigid spacer element. The role of the spacer elements is to prevent the two electrode surfaces from contacting each other, which would form an electrical short circuit. The rigid spacer element is particularly helpful when flexible substrates are used, which may not otherwise be able to maintain a uniform separation between the first and second opposing electrodes. The spacer elements need to be large enough in diameter to prevent the shorting of the device across the entire device active area. For this reason, the spacers are loaded into the electrolyte formulation and spread evenly across the device active area during the lamination of the electroactive composition. In a preferred embodiment, the spacer elements include spherical beads (e.g., "MICROPEARL" 50 micrometer diameter PMMA beads available from Sekisui Plastics Co., Tokyo, Japan) but could include other geometries and optically transparent polymers or ceramics such as silica or alumina as well. The beads should be larger in diameter than the channel width, so that the beads can rest on top of the channels. Preferably, the spacer elements are optically clear. Concentrations of the beads can be as low as 1 wt. % and as high as 10 wt. % relative to the total solids in the electrolyte/EDOT formulation, and preferably between 1 wt. % and 5 wt. % relative to the solids in the electrolyte/EDOT formulation. The beads may be used in combination with a spacer "window" which frames the active area of the device and also separates the opposing electrodes at the edges. Any inert plastic may be used for this purpose, including those listed as appropriate substrate materials. In a preferred embodiment, a 5-mil poly(ethylene terephthalate) rectangular frame is cut and adhered to the microstructured electrode to frame the device.

The first transparent electrically conductive layer may comprise a conductive metal oxide such as indium tin oxide (ITO), indium-doped zinc oxide, fluorine-doped tin oxide, conductive polymer (e.g., polyaniline or poly(ethylenedioxythiophene)/polystyrenesulfonate), nanocarbons (e.g., carbon nanotubes or graphene), printed or self-assembled metal grids, metallic nanowires, or combinations thereof. Preferably, indium tin oxide that is sputter coated onto PET film substrates are used, and these are commercially available from Delta Technologies, Loveland, Colo., under the trade designation "PF-85IN-1502." The thickness of the conductive layer may be less than about 500 nm, preferably less than 200 nm. In some embodiments, the conductive layer is disposed in some discontinuous form across a surface of the transparent substrate, forming a pattern comprising transparent conductive regions and transparent non-conductive regions. The surface conductivity may exhibit a sheet resistance of 50-300 Ω/square, but preferably between 50-150 Ω/square.

In some embodiments, the first transparent electrically conductive layer of the first transparent electrode comprises metallic nanowires disposed on a transparent substrate, and a polymeric overcoat layer is disposed on the metallic nanowires opposite the transparent substrate. Such transparent electrodes are described in International (PCT) Published Patent Application No. WO 2012/145157 (Pellerite et al.), filed Apr. 15, 2011. For example, the transparent electrode may comprise a silver nanowire layer exhibiting sheet resistance of 50-150 Ω/square, overcoated with a layer of polymer to protect the silver from oxidation and to enhance adhesion of the electrolyte/EDOT formulation. In addition, the silver nanowire-based transparent electrodes can offer high transmission levels at lower sheet resistance in comparison with other conductive materials. As described in International (PCT) Published Patent Application No. WO 2012/145157, the polymeric overcoat layer may comprise nanoparticles selected from the group consisting of antimony tin oxide, zinc oxide and indium tin oxide; and the sheet resistance of the polymeric overcoat layer disposed on the transparent substrate without the conductive layer is greater than about $10^7$ Ω/sq. For use in the switchable privacy devices of this invention, the thickness of the protective polymeric overcoat layer applied to the silver nanowire conductive layer may have to be adjusted so as to allow the necessary current flow between the electrode and the electrochromic active layer.

The substrate layer (see 310 in FIG. 3) is a support substrate that provides mechanical support. The substrate can comprise any useful material such as, for example, polymer, glass, ceramic, metal, metal oxide, or a combination thereof. Depending on particular applications, the substrate layer may be rigid, semi-rigid, or flexible/conformable. Suitable materials for the substrate layer may be rigid, semi-rigid, or flexible polymeric materials such as thermoplastic materials (e.g., polyolefins and polyethylene terephthalates). Examples of polymers that may be used as the transparent substrate include thermoplastic polymers such as polyolefins, poly(meth)acrylates, polyamides, polyimides, polycarbonates, polyesters, polyethylene, polypropylene, polystyrene, poly(methylmethacrylate), bisphenol A polycarbonate, poly(vinyl chloride), poly(ethylene naphthalate), cellulose acetates and poly(vinylidene fluoride). Some of these polymers also have optical properties (e.g., transparency) that make them especially well-suited for certain display applications wherein they would support a patterned conductor, such as polycarbonates, particularly suitable materials include thermoplastic materials that are flexible and optically transparent as thin layers. Flexibility is defined by the ability to wrap around a cylindrical mandrel of 2.5 cm in diameter without damaging the integrity of the layer. When a flexible substrate is used, the film may be wound up and provided as a roll, thereby enabling production using continuous roll-to-roll processes. The transparent substrate may have any useful thickness, ranging from about 5 micrometers to about 1000 micrometers. Additionally, the substrate may be primed or treated to promote adhesion to the polymerizable precursor material (e.g., acrylic priming, plasma and corona treatments).

Although the substrate layer (e.g., 310 in FIG. 3) is shown as a single layer, this layer may be a unified stack comprising many different layers. The different layers may provide a variety of optical enhancement properties, such as anti-glare, anti-fog, light polarization, opacity, anti-reflective, reflective and any combinations thereof.

As mentioned previously, the electroactive composition is spread over the top of the second (microstructured) electrode, and then laminated against the first (planar) electrode. Both electrodes are disposed such that the electronically active surfaces are facing each other. The electroactive liquid composition is allowed to wick into the microchannels via capillary action briefly. Optionally, an adhesive sealant may be applied around the edges of the device in order to ensure the mechanical integrity of the device during handling. Typically, the sealant is applied to bond the interface of the first and second electrode substrates. The adhesive sealant may also prevent the egress of water, moisture or oxygen into the device, which may harm or otherwise degrade the properties of the electroactive monomer over time. Exemplary materials for the adhesive sealant include "Norland Optical Adhesive 68," from Norland Products Inc. (Cranbury, N.J.), "Scotch-Weld CA9 Instant Adhesive" from 3M Corp (St. Paul, Minn.), or "Superflex Clear RTV Silicone Adhesive Sealant 30562" from Loctite Corp. (Rocky Hill, Conn.). In a preferred embodiment, Norland 68 is used. The adhesive sealant may be cured in air at room temperature, using heat, or under ultraviolet irradiation. The adhesive sealant may be cured before, after or at the same time as the gel electrolyte material in the electroactive composition.

The electronically switchable privacy device is constructed to purposely leave exposed areas of the first and second electrodes to enable electrical ohmic contact via silver paste or another suitable conductor material. Preferably, colloidal silver paste "TED PELLA 187" is first spread over the exposed electrode area with a brush or via screen printing methods. Then, copper electrical tape (3M Co, St. Paul, Minn.) is applied over the top of the silver paste. Alternatively, only the copper electrical tape may be used. Enough electrical tape is used to form a 'tab' overhang on the edges, so that electrical leads such as alligator clamps can be attached to the electrical tape, and not the device. This prevents accidental damage of the device during operation. The exposed conductive material is typically disposed along edges of the respective electrodes (see, e.g., 290' and 390 in FIG. 3). A positive bias is applied to one electrode, while a negative bias (or ground terminal) is applied to the other electrode, or vice versa. The potential difference between the two transparent electrodes enables the passage of electric current which is used to electrochemically change the properties of the switchable material for switching between privacy and share modes.

After the device is fully constructed, the electroactive monomer may be polymerized in situ in the assembled device by applying voltage (oxidative potential) across the device. The electroactive monomer irreversibly converts to the conjugated polymer and can be oxidized or reduced by ionic charges in the electrolyte using voltages of opposing polarities. In another embodiment, the electroactive monomer may be polymerized before the gel electrolyte is polymerized. In yet another embodiment, both the gel electrolyte and the electroactive monomer may be polymerized simultaneously.

The microstructured resin surface beneath the second electrode is optimized for a larger change in transmission at angles greater than 30° relative to normal when the electrochromic material is switched between its electrochemically oxidized and reduced states. In an exemplary device, the electrochromic material contains a semi-interpenetrating network of poly(3,4-ethylenedioxythiophene) (PEDOT) and a blend of poly(ethylene glycol diacrylate) and lithium triflate to act as curable electrolyte inside the microchannels. Upon application of a suitable direct current voltage ($\pm 2.0$V), the device can be repeatedly switched between a dark state to a transmissive state for privacy and share modes, respectively.

When using electrochromic materials as the electronically switchable material, the voltage to which the electronically switchable material responds may be determined by the electrochemical properties of the electrochromic material and the electrolyte medium supplying it with ions. The time necessary to change the absorption properties of the electrochromic material depends on how quickly ions can move in and out of said electrochromic material, and this depends on the properties of the gel electrolyte. Gels of high crosslink density will have relatively less ionic mobility compared to gels of lower crosslink density. Typical response times for the device range from 1 second up to 6 minutes in order to completely effect an electrochemical oxidation or reduction of the PEDOT inside the channels. Those skilled in the art will appreciate that crosslink density can be tuned by optimizing photoinitiator or plasticizer concentration, cure time, polymer functionality and the like.

When a first DC voltage is applied, the film is in a privacy mode such that it has a light transmission of less than about 10% at a viewing angle of 30°. When a second DC voltage is applied, the film is in the share mode such that it has an increase in light transmission and the difference in transmission between the privacy mode and share mode is at least 5% for viewing angles from about 30 to about 45°. The film has a light transmission of at least about 25% in share and privacy modes at viewing angles from 0° to about 15°.

The electronically switchable material may be selected such that when the second DC voltage is applied, the electronically switchable privacy film is in the share mode such that it has an increase in light transmission and the difference in transmission between the privacy mode and share mode is at least 5% for viewing angles from about 30° to about 45°. For some embodiments, the difference is at least 6%, 7%, 8%, 9% or 10% or greater. When in share mode, the transmission is typically at least 10% to 15% for angles ranging from 30 to 45 degrees. In some embodiments, the transmission of the privacy film in share mode is no greater than 40%, or 35%, or 30%, or 25% for angles in a range from 30° to 45°. Any voltage in between first and second voltages may be used, in order to effect varying optical responses. This may be advantageous in certain applications, such as dimmable windows for automobiles, etc.

A small 1.5 V DC coin cell battery may provide voltage to the privacy filter. The privacy filter demands very little current to operate, so the coin cell battery can provide the current needed to operate the filter while lasting for many weeks before needing to be replaced (dependent on how often the filter is switched.) A double throw double pole (DTDP) switch allows a user to clear or darken the privacy filter by providing voltages of opposing polarity. In one position, the switch applies a positive voltage across the filter. In the other position, the switch applies a negative voltage across the filter. A simple wiring diagram is shown in FIGS. 4A and 4B.

Figure 10:
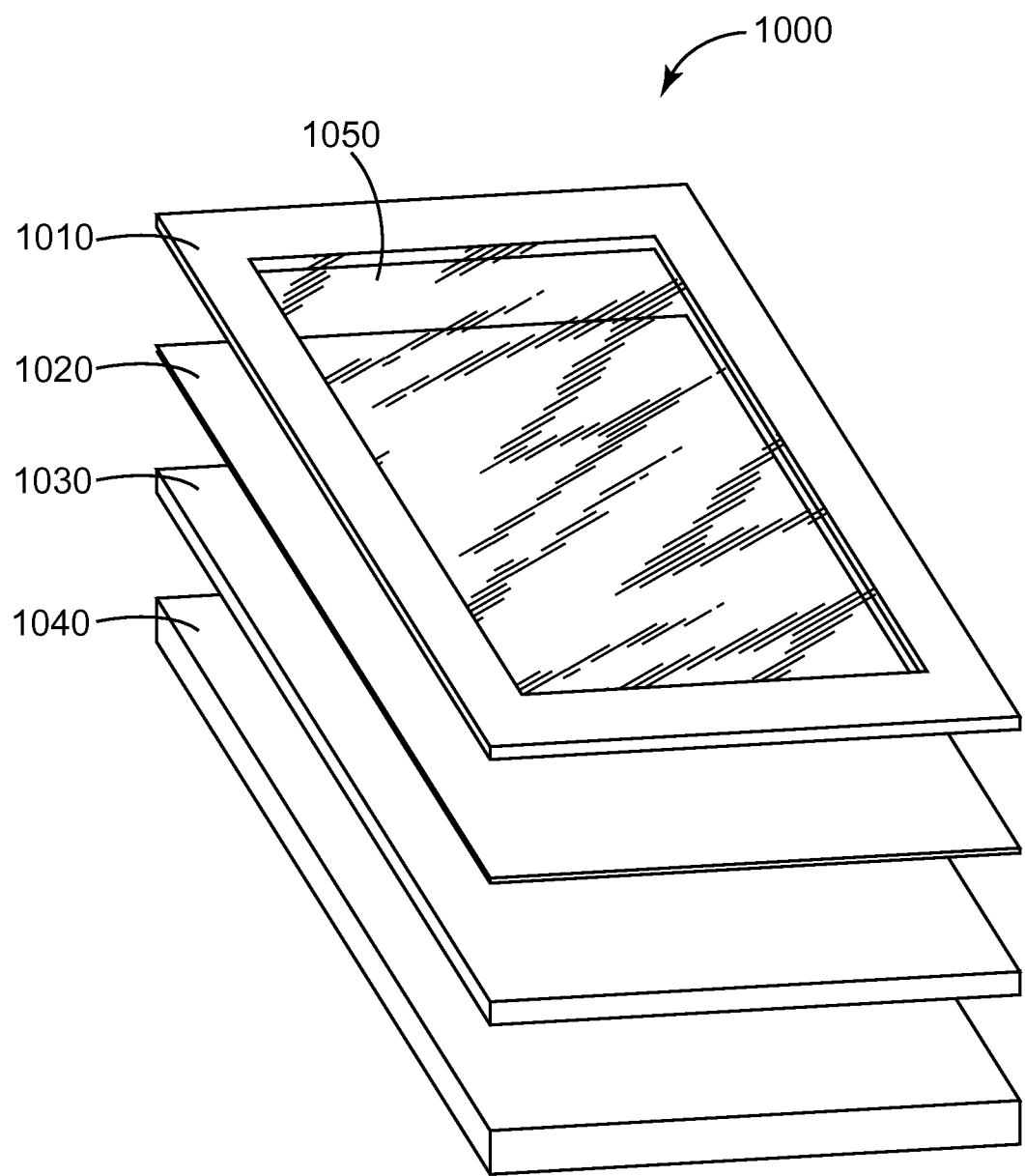
FIG. 10 shows an exploded isometric view of an electronic display device comprising an electronically switchable privacy device.

The coin cell battery and the switch may be mounted on the back of a touch screen display device to allow the user to change the battery (if needed) and to operate the switch. Power is delivered to the electronically switchable privacy device through two flexible copper tapes routed through the display device. The switchable privacy device is positioned between the display and the touch screen of the display device. The capacitive touch screen of the display device is only sensitive to changes in capacitance when applied to the front of the touch screen assembly. Changes in capacitance behind the touch screen are not registered as clearly as changes on the front of the screen (the touch sensor would sense noise from the display if this were allowed), which makes the area behind the screen and in front of the display a suitable place to install the switchable privacy device. The electrodes on the switchable privacy device are isolated from the other components within the device by insulating the electrodes with vinyl electrical tape. FIG. 10 illustrates the installation of the switchable privacy device into an example touch screen display device (battery pack not shown). None of the installed components affect normal operation of the device.

Another preferred embodiment uses the device's own power supply to power the privacy device, thereby removing the need for an external battery pack and switch. The display device generally has a regulated DC supply that it uses to power its microprocessor and other IC's. This DC supply could be used to directly power the privacy device, or the voltage suitably modified if the privacy device were powered in series with a diode. An H-bridge or driver IC could be used to switch the voltage across the filter in the same way that the DTDP switch switched the voltage across the demonstration model. Control of the state of the privacy device could be controlled through the on-screen controls programmed into the device. The user would simply need to select the state of the privacy device by toggling a touch button.

Also disclosed herein is an electronically switchable privacy device comprising the electronically switchable privacy device and circuitry for supplying the electric field. Circuitry may include transformers, amplifiers, rectifiers, diodes, resistors, capacitors, transistors and the like.

Also disclosed herein is a display device comprising an electronically switchable privacy film-based device, as described herein. In general, the display device comprises some type of light transmissive display panel such as a liquid crystal display (LCD) panel. LCD devices typically comprise an outer substrate or light output substrate adjacent the light transmissive display panel and providing a viewing surface.

Figure 6A:
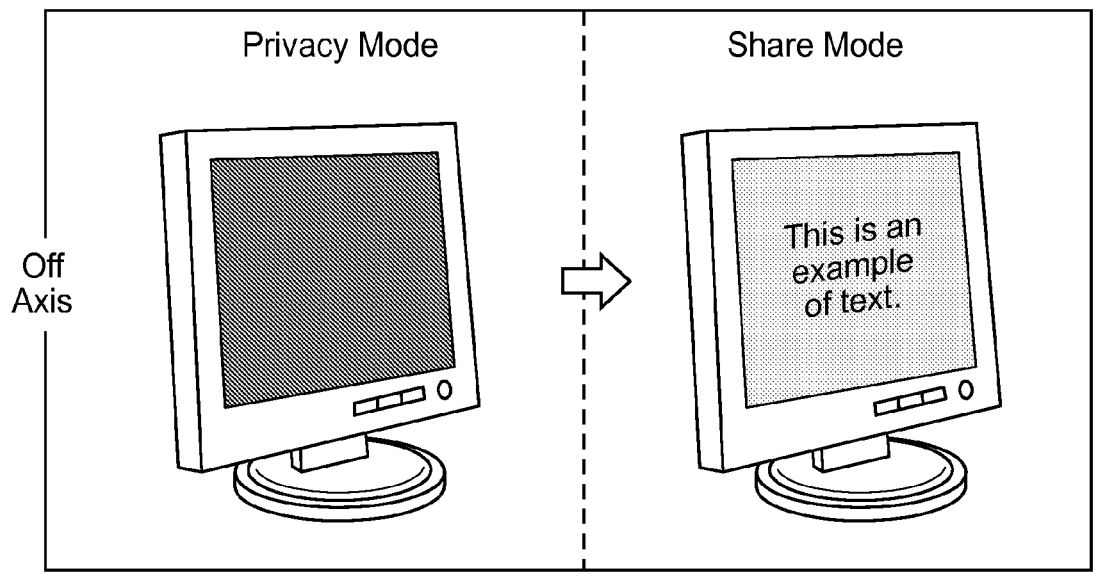
FIGS. 6A and 6B show schematic representations of an exemplary electronically switchable privacy device used with an exemplary electronic display device.
Figure 6B:
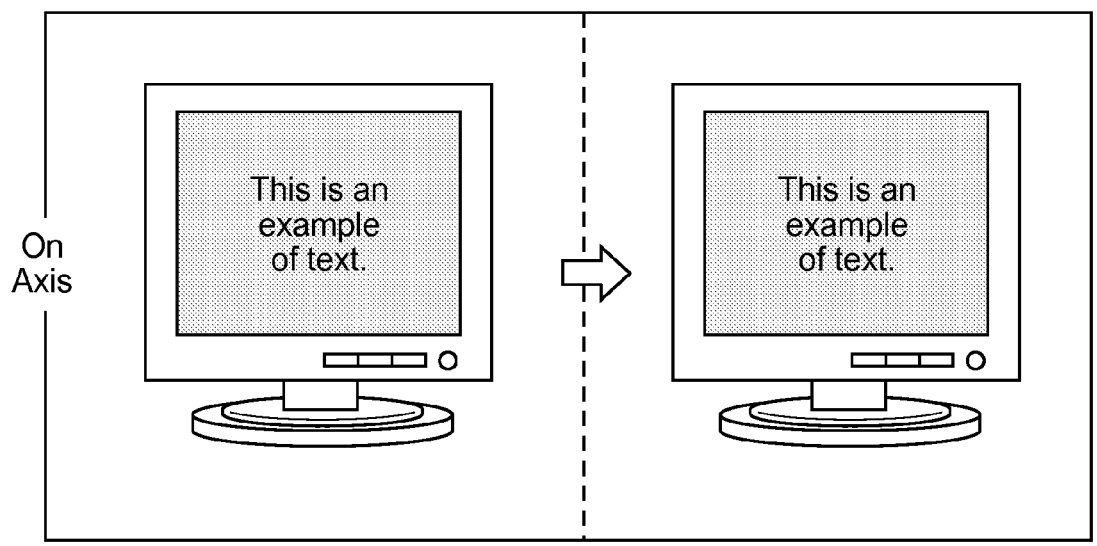

FIGS. 6A and 6B show schematic representations of an exemplary electronically switchable privacy device used in conjunction with an electronic display device. In this representation, either a privacy device of the present disclosure is disposed on the viewing surface of the electronic display device, or it is contained within the electronic display device, for example, between the liquid crystal display panel and a substrate that forms the outer viewing surface. In the privacy mode as shown in the left hand side of the representation in FIG. 6A, an observer positioned at some off-axis angle relative to the normal of the viewing surface is not able to view contents being displayed. The user of the electronic display device activates an electronic switch such that the privacy device is electronically switched to a share mode, shown on the right side of FIG. 6A, and the observer is able to view contents being displayed without having to reposition himself. The user is positioned on-axis or at zero degree angle relative to the normal of the viewing surface, and contents being displayed by the electronic display device are viewable in both privacy and share modes regardless of whether or not the privacy device has been electronically switched, as shown in FIG. 6B.

Figure 7A:
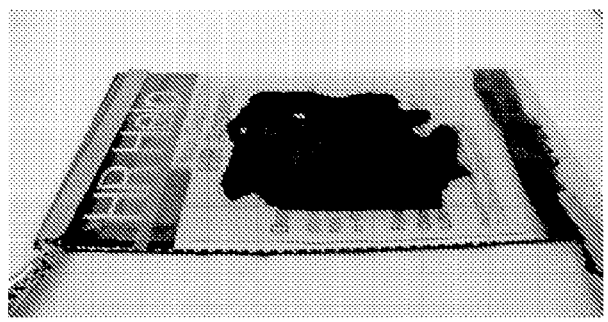
FIGS. 7A, 7B, 7C, and 7D show images of an exemplary electronically switchable privacy device used in front of a business-card sized magnet containing text.
Figure 7B:
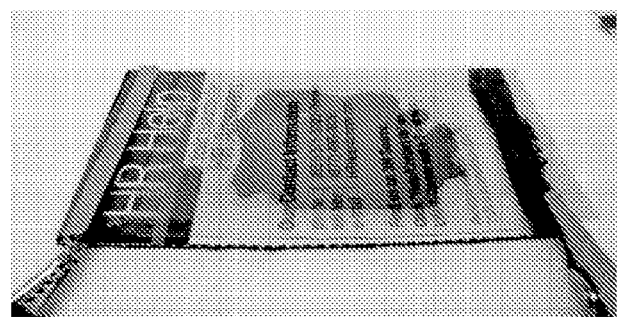
Figure 7C:
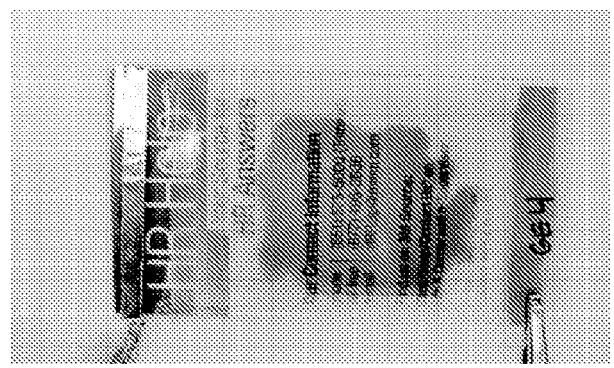
Figure 7D:
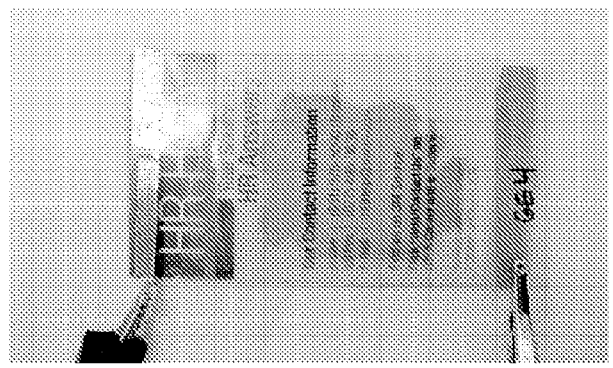
Figure 8A:
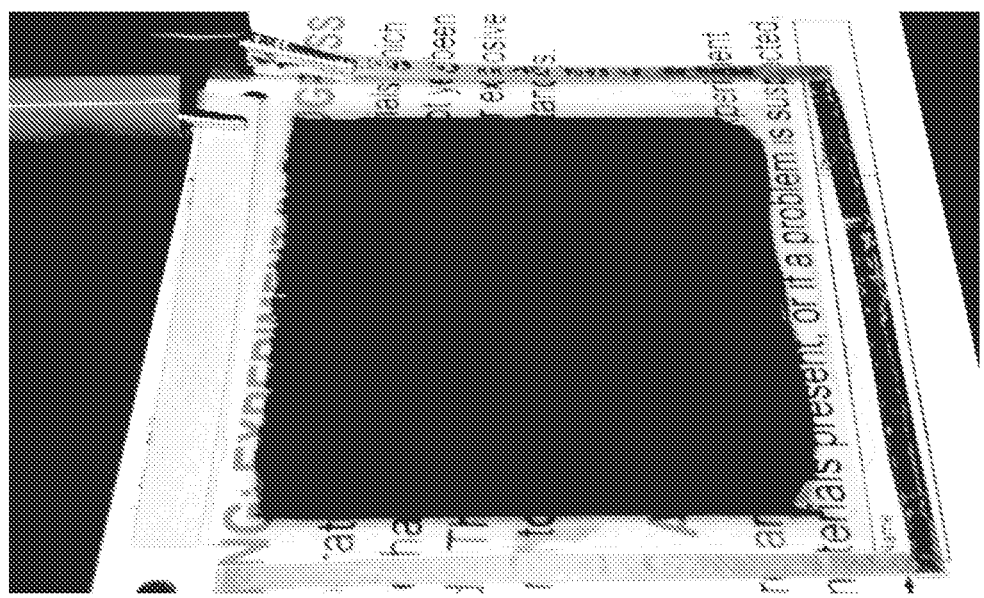
FIGS. 8A and 8B show images of an exemplary electronically switchable privacy device used in front of a page containing text.
Figure 8B:
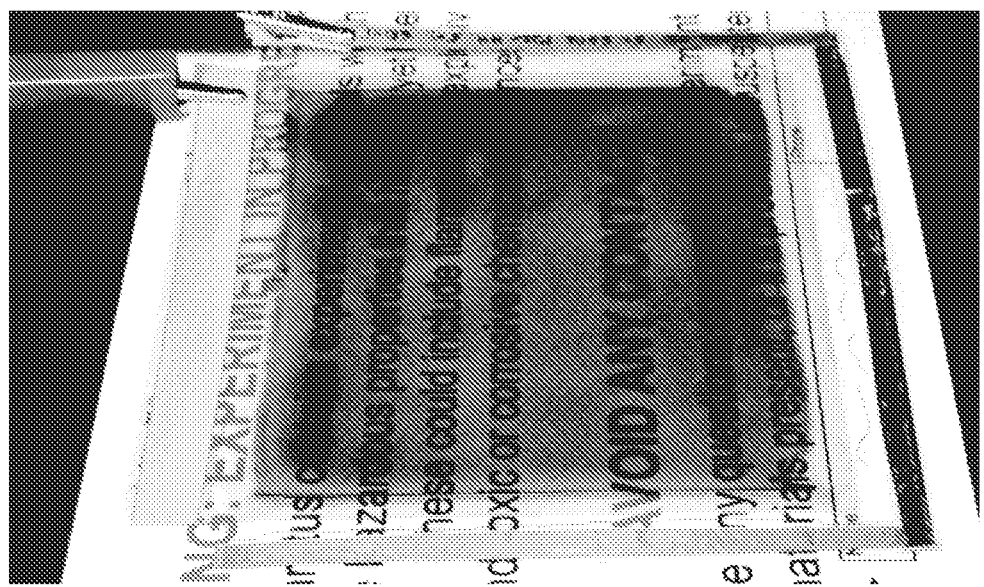

FIGS. 7A-7D and 8A-8B show images of an exemplary electronically switchable privacy device used with a text background. For the device shown in FIGS. 7A-7D, In the device privacy mode (e.g., FIGS. 7A and 8A), an observer positioned at some off-axis angle relative to the normal of the privacy device is not able to view text behind the privacy device. An electronic switch is activated such that the privacy device is electronically switched to a share mode, and (as shown in FIGS. 7B and 8B), text behind the privacy device can be seen. From an on-axis position (zero degree angle relative to the normal of the privacy device), text behind the device can be seen in both privacy and share modes regardless of whether or not the privacy device has been electronically switched (e.g., as in FIGS. 7C and 7D).

SELECT EMBODIMENTS OF THE PRESENT DISCLOSURE

The present disclosure provides the following items as select embodiments:

Item 1. A privacy device that is electronically switchable, comprising:
  a first transparent electrode layer comprising:
    a first transparent substrate layer and a first transparent electrically conductive layer disposed on a major surface of the first transparent substrate layer, wherein the first transparent substrate layer is flexible;
  an electronically switchable layer disposed adjacent to the first transparent electrically conductive layer;
  a second transparent electrode layer disposed adjacent to the electronically switchable layer and opposite the first transparent electrically conductive layer, the second transparent electrode layer comprising:
    a second transparent substrate layer;
    a plurality of microstructured ribs extending across a major surface of the second transparent substrate layer such that the microstructured ribs form an alternating series of ribs and channels, each channel having channel walls defined by adjacent ribs;

a plurality of transparent electrode members comprising a transparent electrode material disposed on at least one channel wall in a corresponding plurality of the channels; and a bus member providing electrical connectivity across the plurality of second transparent electrode members; and a spacer element disposed in the electronically switchable layer such that the first transparent electrode layer is spaced apart from the second transparent electrode layer by the spacer element;

wherein a portion of the electronically switchable layer at least partially fills the plurality of channels and makes electrical contact with the plurality of transparent electrode members;

wherein the electronically switchable layer comprises an electronically switchable material capable of modulation between high and low light absorption states upon application of a direct current voltage across the first and second transparent electrode layers; and wherein:

when a first direct current voltage is applied, the film is in a privacy mode such that it has a light transmission of less than about 10% at viewing angle of 30°;

when a second direct current voltage is applied, the film is in a share mode such that it has an increase in light transmission and the difference in transmission between the privacy mode and the share mode is at least 5% for viewing angles from about 30° to about 45°, and the film has a light transmission of at least about 25% in share and privacy modes at viewing angles from 0° to about 15°.

Item 2. The privacy device of item 1, wherein the electronically switchable material comprises an organic electrochromic material.

Item 3. The privacy device of item 2, wherein the organic electrochromic material is at least one of a surface-bound viologen dye, a phenothiazine, a diarylethene, or an electrically conductive polymer.

Item 4. The privacy device of item 3, wherein the electrically conductive polymer is at least one of a polyaniline, a polypyrrole, a polyphenylene vinylene, a polyphenylene ethynylene, a polyalkoxythiophene or a polyfluorene.

Item 5. The privacy device of item 4, wherein the electrochromic material comprises an electrically conductive polymer that comprises a polyethylenedioxythiophene.

Item 6. The privacy device of any one of items 1 to 5, wherein the electronically switchable layer comprises an interpenetrating network of an electrically conductive polymer and a gel electrolyte material.

Item 7. The privacy device of item 6, wherein the electronically switchable layer comprises a crosslinking unit, and wherein the crosslinking unit is ethylene glycol diacrylate.

Item 8. The privacy device of any one of items 1 to 7, wherein the spacer element is a plurality of spacer beads.

Item 9. The privacy device of any one of items 1 to 8, wherein the transparent electrode material disposed on the at least one channel wall is disposed on both of the channel walls in the corresponding plurality of the channels.

Item 10. The privacy device of any one of items 1 to 9, wherein at least some of the transparent electrode members in the plurality of transparent electrode members each has a unitary construction comprising the transparent electrode material disposed continuously on both of the channel walls and across a channel floor defined by a portion of the second substrate extending between adjacent ribs.

Item 11. The privacy device of any one of items 1 to 10, wherein each rib of the second transparent electrode layer has a height from about 25 micrometers to about 150 micrometers and a width from about 25 micrometers to about 50 micrometers.

Item 12. The privacy device of any one of items 1 to 11, wherein each rib has height H, width W and rib aspect ratio H/W greater than about 1.5.

Item 13. The privacy device of any one of items 1 to 12, wherein each channel of the second transparent electrode layer has a height from about 25 micrometers to about 150 micrometers and a width from about 1 to about 50 um.

Item 14. The privacy device of any one of items 1 to 13, wherein each channel has height H, width Y and channel aspect ratio H/Y greater than 5.

Item 15. The privacy device of any one of items 1 to 14, wherein the first transparent electrode layer is spaced apart from the second transparent electrode layer at a minimum distance of from about 25 micrometers to about 150 micrometers.

Item 16. An article comprising: the privacy device of any one of items 1 to 15, and circuitry for supplying the direct current voltage.

Item 17. A display device comprising: a display pixel array; a display cover surface adjacent the display pixel array, the display cover surface comprising a viewing surface opposite the display pixel array; and the privacy device of any one of items 1 to 15 disposed on the viewing surface.

Item 18. A display device of item 17, wherein the privacy device of any one of items 1 to 15 is disposed between the display pixel array and the display cover surface.

Item 19. The display device of item 18, wherein the display cover surface comprises a touch sensor.

EXAMPLES

The operation of the present disclosure will be further described with regard to the following detailed examples. These examples are offered to further illustrate the various specific and preferred embodiments and techniques. It should be understood, however, that many variations and modifications may be made while remaining within the scope of the present disclosure.

As used herein, all percentages or parts are by weight unless indicated otherwise. The term "wt. %" is an abbreviation for "weight percent".

Transmission Measurements

Unless otherwise indicated, transmission values were measured using a haze meter (obtained from BYK-Gardner USA, Columbia Md., under the trade designation "HAZE-GARD PLUS").

Materials used in the examples are listed in Table 1.

TABLE 1

| | |
|---|---|
| 3M COPPER TAPE | A copper tape, about 0.75 inch (about 19 mm) wide and 2 mil (51 micrometers) thick (obtained from 3M Company, St. Paul, MN, under the trade designation "3M 1181 ELECTRICAL TAPE") |
| Acrylate resin | The acrylate resin is described in U.S. Pat. No. 8,012,567 (Gaides et al.). |
| DMPA | 2,2-Dimethoxy-2-phenyl acetophenone (obtained from TCI Chemicals, Montgomeryville, PA) |
| EDOT | 3,4-Ethylenedioxythiophene (obtained from Sigma-Aldrich Co., St. Louis, MO) |
| Ethylene glycol | Ethylene glycol (obtained from Sigma-Aldrich Co., St. Louis, MO) |
| EGDA | Ethylene glycol diacrylate (obtained from Sigma-Aldrich Co., St. Louis, MO) |

TABLE 1-continued

| | |
|---|---|
| ITO coated PET film | Polyethylene terephthalate film coated with a layer of indium tin oxide, 100 Ω/□ (obtained from Delta Technologies, Loveland, CO, under the trade designation "PF-85IN-1502") |
| LiOTf | Lithium trifluoromethylsulfonate (obtained from Alfa Aesar, Ward Hill, MA) |
| NOA 61 | An optical quality adhesive (obtained from Norland Products, Inc., Cranbury, NJ, under the trade designation "NORLAND OPTICAL ADHESIVE 61") |
| NOA 68 | An optical quality adhesive (obtained from Norland Products, Inc., Cranbury, NJ, under the trade designation "NORLANDOPTICAL ADHESIVE 68") |
| PC | propylene carbonate (obtained from Sigma-Aldrich Co., St. Louis, MO) |
| PEDOT/PSS aqueous dispersion | Poly(3,4-ethylenedioxythiophene)/polystyrenesulfonate, 1-2 wt. % solids, aqueous dispersion (obtained from Heraeus, Leverkusen, Germany, under the trade designation "CLEVIOS PH1000") |
| PEGDA | polyethylene glycol diacrylate, Mn = 700 grams/mol (obtained from Sigma-Aldrich Co., St. Louis, MO) |
| PET film | Photograde polyethylene terephthalate film, 5 mil (127 micrometers) thick (obtained from DuPont Films, Wilmington, DE, under the trade designation "MELINEX 618") |
| PMMA beads | Poly(methyl methacrylate) beads, 50 micrometer diameter (obtained from Sekisui Plastics Co., Tokyo, Japan, under the trade designation "MICROPEARL") |
| Primed PET film | A primed polyethylene terephthalate film, 5 mil (approximately 125 micrometers) thick (obtained from DuPont Films, Wilmington, DE, under the trade designation "MELINEX 618) |
| Colloidal silver paste | A paste of colloidal silver (obtained from Ted Pella, Inc., Redding, CA, under the trade designation "PELCO CONDUCTIVE SILVER 187") |

Example 1

Preparation of Microstructured Film Layer for Example 1

Microstructured films were prepared by molding and UV curing an acrylate resin formulation on primed PET film using a roll-to-roll web coating process, according to the following details. The acrylate resin formulation (described in U.S. Pat. No. 8,012,567 (Gaides et al.)) was heated to 80° C. before coating to decrease the viscosity of the resin and then was poured onto the moving web. The web speed used was 10 ft/min. (about 3 meters/min.), and the coated web was pressed against a microstructured cylindrical imprinting tool operating at 110° F. (43° C.). The microstructured resin was then cured using two banks of FUSION high intensity UV D-bulb lamps (obtained from Fusion Systems, Rockville, Md.) set at 600 watt/2.5 cm (100% power setting). The cured, microstructured resin then passed through an annealing oven set for 200° F. (93° C.) for a four foot (1.2 meter) length. The resulting microstructured film had regularly spaced ribs and channels, with channel walls and channel floor being nominally at right angles to each other. Features of the microstructured surface of the film are summarized in Table 2.

TABLE 2

| Rib, Channel Height (H), micrometers | Pitch (P), micrometers | Rib Width (W), micrometers | Channel Width (P − W), micrometers | Rib Aspect Ratio (H/W) | Channel Aspect Ratio H/(P − W) |
|---|---|---|---|---|---|
| 74 | 31.7 | 24 | 7.7 | 3.08 | 9.61 |

The microstructured surface of the film was cleaned by exposure to air plasma for 3 min. under a vacuum of $10^{-2}$ torr, and any remaining dust was removed from the microstructured surface with pressurized clean nitrogen, providing a cleaned microstructured film (approximately 15 cm by 23 cm).

Preparation of Conductive Microstructured Cathode for Example 1

An aqueous formulation of a transparent conductive polymer containing a mixture of 95 parts by weight PEDOT/PSS aqueous dispersion and 5 parts by weight ethylene glycol was applied to the leading lamination edge of the cleaned microstructured film prepared above. A cover sheet of PET film was placed over the coated area and a laminating nip was lowered onto the sandwich of films. The lamination was done in the direction of the microchannels in the microstructured film (such that the solution was pushed into the microchannels), with a pressure of 20 psi (140 kPa) and a speed of 10 feet per minute (about 3 meters per minute). Lamination was stopped prior to the solution running off the trailing edge and the laminate was allowed to sit for 10 minutes so that the solution could settle and fill into the channels via capillary action. The PET sheet was removed and then excess solution on top of the microstructures was wiped off with a clean-room wipe. The coated sample was taped to a glass plate and placed in a recirculating air oven for 3 minutes at 120° C. Next, a second coating of the above PEDOT/PSS aqueous dispersion and ethylene glycol mixture was applied over the top of the first coating using the same procedure as described, and dried as above. A 1 cm width band of colloidal silver paste was then spread across the transparent conductor coated film along one edge of the film, perpendicular to the microchannel direction so as to provide a "bus bar" that electrically connected each of the channels filled with transparent conductor. The samples were placed into an oven for 10 min. at a temperature of 80° C. to dry the solvent from the colloidal paste. A resistance measurement was performed using a standard ohmmeter (2-point probe) on a 10 cm×10 cm area, resulting in a resistance value of about 85 ohms.

Framing the Device for Example 1

To control the spreading of a curable liquid electrolyte on the microstructured cathode, and to help avoid electrical shorting between the cathode and anode, a 'window frame' of at least 4 inches by 4 inches (about 10 cm by 10 cm) was cut out of 2 mil (51 micrometers) unprimed PET film. Using a fine-tipped transfer pipette (obtained from Samco Scientific, San Fernando, Calif., under the trade designation "SAMCO"), NOA 61 adhesive was placed around the boundary of the microstructured cathode. A thin rectangular frame of 2 mil (51 micrometers) PET was placed on top of the adhesive, forming a stack. The stack was covered with a release liner (obtained from CP Films, Fieldale, Va., under the trade designation "T50 CLEARSIL") and smoothed using a hand roller, and the stack was placed under a bank of 365 nm UV lamp bulbs (2.0 mW/cm$^2$) for 15 minutes in air to cure the adhesive. The release liner was then removed before the next step.

Preparation of Curable Electrolyte Formulation for Example 1

A curable electrolyte formulation was prepared by charging the components listed in Table 3 into a clean and dry amber vial.

TABLE 3

| Component Name | Quantity, grams |
| --- | --- |
| PEGDA | 1.56 |
| PC | 0.26 |
| LiOTf | 0.18 |
| DMPA | 0.003 |
| EDOT | 2.0 |
| EGDA | 0.02 |
| PMMA beads | 0.01 |

The mixture in the vial was vortexed for 1 minute at 3000 rpm, and then sonicated for 30 minutes in a 35° C. to 45° C. water bath to fully dissolve all soluble components and disperse the PMMA beads homogenously.

Anode Application and First Curing of the Polymer Electrolyte Layer for Example 1

An anode layer was prepared by cutting an ITO coated PET film slightly larger than the window frame of the cathode device, so that about a 1 inch (about 2.5 cm) anode overhang was present around three sides of the cathode. The ITO surface was plasma cleaned in an oxygen environment for 1 minute prior to lamination, then 2 milliliters of the curable electrolyte/EDOT formulation (see Table 3) was dispensed onto the framed area of the microstructured cathode film using a plastic pipette, taking care to avoid formation of air bubbles. The anode layer was positioned on top of the layer of curable electrolyte, ITO-side down, and was gently but firmly pressed down using a hand roller at least the width of the cathode device, making sure to maintain the 1 inch overhang on the three sides of the cathode that did not contain the silver paste bus bar. Excess material that flowed out past the trailing edge was removed with a clean-room wipe. After the coating of curable electrolyte, NOA 68 adhesive was applied around all 4 sides of the anode/cathode interface to seal the device. This stack of films was placed under a bank of UV bulbs for 15 minutes at 2.0 mW/cm$^2$ to cure the layer of curable electrolyte and the NOA 68 adhesive simultaneously, while leaving the EDOT material substantially unpolymerized. A strip of 3M COPPER TAPE about 0.125" (about 3 mm) wide was then placed on the ITO anode overhang area around three sides of the device.

Electropolymerization to Form the Privacy Device of Example 1

The device was attached to a DC Voltage source (obtained from BK Precision Inc., Yorba Linda, Calif., under the trade designation "BK1672 TRIPLE OUTLET DC VOLTAGE POWER SUPPLY"), using the positive terminal attached to the silver paste on the microstructured film side (i.e., the cathode), and the negative terminal attached to the copper tape on the top electrode (i.e., the anode). A+4.0V DC voltage was applied for approximately 10 minutes to electronically polymerize the EDOT monomer inside the matrix of cured polymeric electrolyte. Afterwards, the sample was repeatedly switched to a transmissive light blue (oxidized state) with application of +2.0V DC voltage (share mode), and to a deeply colored blue (reduced state) with application of a −2.0V DC voltage (privacy mode). Transmission measurements of the privacy device in privacy mode and share mode were made at view angles of 0° and 45°, with the results as summarized in Table 4.

TABLE 4

| View Angle, degrees | Transmission, percent | | |
| --- | --- | --- | --- |
| | Privacy mode | Share mode | Delta |
| 0 | 26.7 | 37.3 | 10.6 |
| 45 | 5.4 | 24.1 | 18.7 |

The "Delta" values listed in Table 4 (as well as those listed in Tables 6 and 8, below) were calculated by subtracting the Transmission value in privacy mode from the Transmission value in share mode, for each respective view angle.

Figure 9:
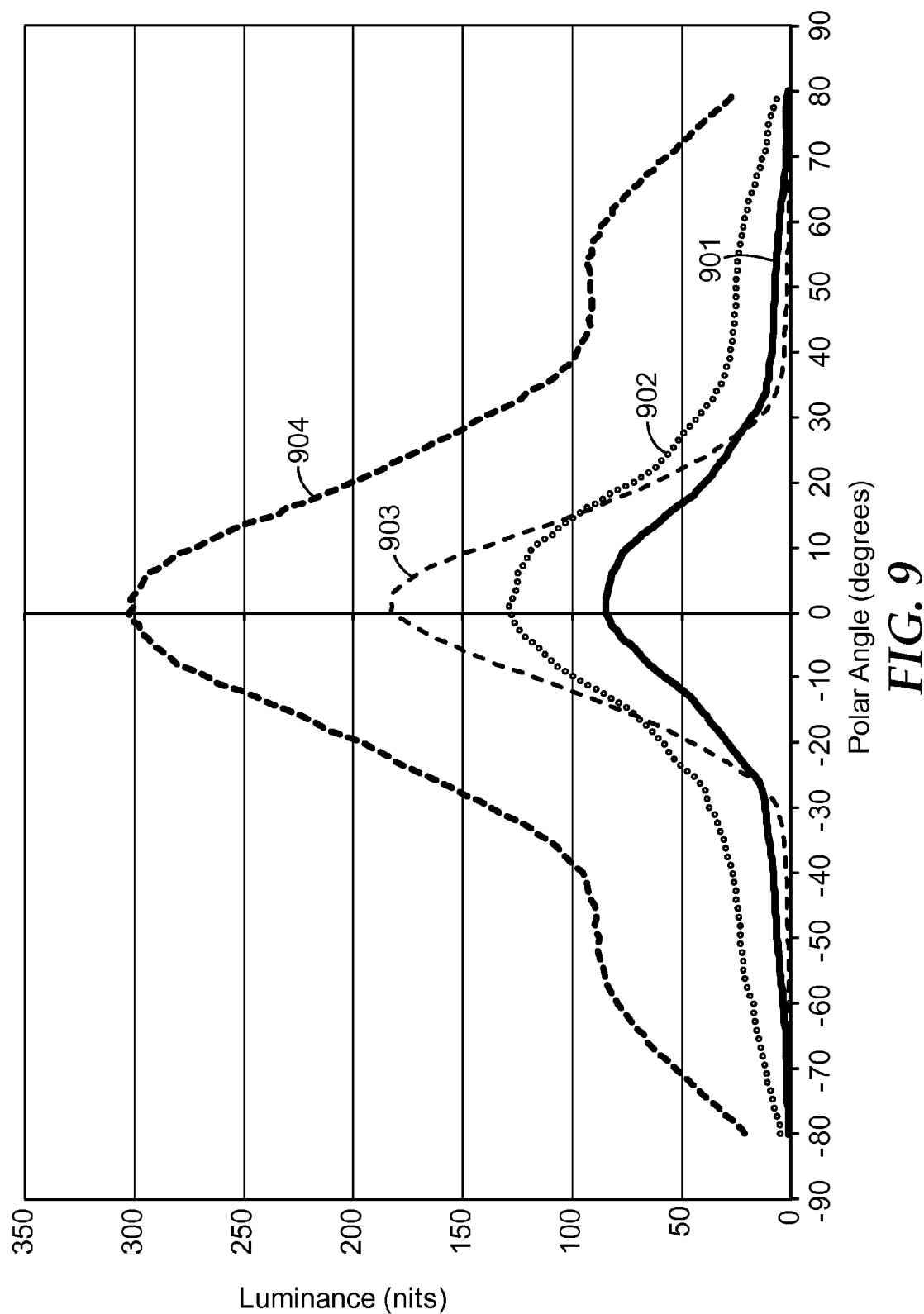
FIG. 9 shows luminance as a continuous function of viewing angle for an exemplary electronically switchable privacy device.

Light transmission as a function of viewing angle was measured for the privacy device of Example 1 using a conoscope (obtained from Eldim Corp., France, under the trade designation "ELDIM 80 CONOSCOPE"). The film was placed on top of the display screen of a display device (obtained from Apple Inc., Cupertino, Calif., under the trade designation "APPLE IPAD") displaying a white screen. The luminance (Cd/m$^2$, or "nits", i.e. brightness) profiles of the display device with and without the privacy device were measured. The privacy device was measured in both privacy and share modes. The ELDIM 80 CONOSCOPE was used to measure the luminance (brightness) profiles of the diffuse light source both with and without the light control filters. A slice along the meridian of the conoscope image shows the luminance (in nits) as a continuous function of viewing angle and this data is shown in FIG. 9. In FIG. 9, 901 is the privacy mode data, 902 is the share mode data, 903 is data for a 3M standard static privacy filter, and 904 is a background signal from an APPLE IPAD display device showing a white screen, for reference.

Example 2

A second privacy device was produced in the same way as Example 1, except that the curable electrolyte formulation was made using the materials listed in Table 5.

TABLE 5

| Component Name | Quantity, grams |
| --- | --- |
| PEGDA | 1.56 |
| PC | 0.26 |
| LiOTf | 0.18 |
| DMPA | 0.003 |
| EDOT | 2.00 |
| EGDA | 0.20 |
| PMMA spacer beads | 0.10 |

Transmission measurements of the device of Example 2 were made, in privacy mode and in share mode, and the results are summarized in Table 6.

TABLE 6

| View Angle, degrees | Transmission, percent | | |
| --- | --- | --- | --- |
| | Privacy mode | Share mode | Delta |
| 0 | 33.1 | 38.5 | 5.4 |
| 45 | 13.1 | 24.8 | 11.7 |

Example 3

A third privacy device was produced in the same way as for Example 1, except that the curable electrolyte formulation was made using the materials listed in Table 7.

TABLE 7

| Component Name | Quantity, grams |
|---|---|
| PGDA | 1.56 |
| PC | 0.26 |
| LiOTf | 0.18 |
| DMPA | 0.003 |
| EDOT | 2.0 |
| EGDA | none |
| PMMA spacer beads | 0.10 |

Transmission measurements of the device of Example 3 were made on tablet-sized protypes, in privacy mode and in share mode, and the results are summarized in Table 8. FIGS. 7A-7D show performance of the privacy device of Example 3 in business card-sized privacy devices.

TABLE 8

| View Angle, degrees | Transmission, percent | | |
|---|---|---|---|
| | Privacy mode | Share mode | Delta |
| 0 | 18.4 | 23 | 4.6 |
| 45 | 4.9 | 13.1 | 8.2 |

Although specific embodiments have been illustrated and described herein, it will be appreciated by those of ordinary skill in the art that a variety of alternate and/or equivalent implementations can be substituted without departing from the spirit and scope of the invention.

What is claimed is:

1. A privacy device that is electronically switchable, comprising:
a first transparent electrode layer comprising:
a first transparent substrate layer and a first transparent electrically conductive layer disposed on a major surface of the first transparent substrate layer, wherein the first transparent substrate layer is flexible;
an electronically switchable layer disposed adjacent to the first transparent electrically conductive layer;
a second transparent electrode layer disposed adjacent to the electronically switchable layer and opposite the first transparent electrically conductive layer, the second transparent electrode layer comprising:
a second transparent substrate layer;
a plurality of microstructured ribs extending across a major surface of the second transparent substrate layer such that the microstructured ribs form an alternating series of ribs and channels, each channel having channel walls defined by adjacent ribs;
a plurality of transparent electrode members comprising a transparent electrode material disposed on at least one channel wall in a corresponding plurality of the channels; and
a bus member providing electrical connectivity across the plurality of second transparent electrode members; and
a spacer element disposed in the electronically switchable layer such that the first transparent electrode layer is spaced apart from the second transparent electrode layer by the spacer element;
wherein a portion of the electronically switchable layer at least partially fills the plurality of channels and makes electrical contact with the plurality of transparent electrode members;
wherein the electronically switchable layer comprises an electronically switchable material capable of modulation between high and low light absorption states upon application of a direct current voltage across the first and second transparent electrode layers; and
wherein:
when a first direct current voltage is applied, the film is in a privacy mode such that it has a light transmission of less than about 10% at viewing angle of 30°;
when a second direct current voltage is applied, the film is in a share mode such that it has an increase in light transmission and the difference in transmission between the privacy mode and the share mode is at least 5% for viewing angles from about 30° to about 45°, and the film has a light transmission of at least about 25% in share and privacy modes at viewing angles from 0° to about 15°.

2. The privacy device of claim 1, wherein the electronically switchable material comprises an organic electrochromic material.

3. The privacy device of claim 2, wherein the organic electrochromic material is at least one of a surface-bound viologen dye, a phenothiazine, a diarylethene, or an electrically conductive polymer.

4. The privacy device of claim 3, wherein the electrically conductive polymer is at least one of a polyaniline, a polypyrrole, a polyphenylene vinylene, a polyphenylene ethynylene, a polyalkoxythiophene or a polyfluorene.

5. The privacy device of claim 4, wherein the electrochromic material comprises an electrically conductive polymer that comprises a polyethylenedioxythiophene.

6. The privacy device of claim 1, wherein the electronically switchable layer comprises an interpenetrating network of an electrically conductive polymer and a gel electrolyte material.

7. The privacy device of claim 6, wherein the electronically switchable layer comprises a crosslinking unit, and wherein the crosslinking unit is ethylene glycol diacrylate.

8. The privacy device of claim 1, wherein the spacer element is a plurality of spacer beads.

9. The privacy device of claim 1, wherein the transparent electrode material disposed on the at least one channel wall is disposed on both of the channel walls in the corresponding plurality of the channels.

10. The privacy device of claim 1, wherein at least some of the transparent electrode members in the plurality of transparent electrode members each has a unitary construction comprising the transparent electrode material disposed continuously on both of the channel walls and across a channel floor defined by a portion of the second substrate extending between adjacent ribs.

11. The privacy device of claim 1, wherein each rib of the second transparent electrode layer has a height from about 25 micrometers to about 150 micrometers and a width from about 25 micrometers to about 50 micrometers.

12. The privacy device of claim 1, wherein each rib has height H, width W and rib aspect ratio H/W greater than about 1.5.

13. The privacy device of claim 1, wherein each channel of the second transparent electrode layer has a height from about 25 micrometers to about 150 micrometers and a width from about 1 to about 50 um.

14. The privacy device of claim 1, wherein each channel has height H, width Y and channel aspect ratio H/Y greater than 5.

15. The privacy device of claim 1, wherein the first transparent electrode layer is spaced apart from the second transparent electrode layer at a minimum distance of from about 25 micrometers to about 150 micrometers.

16. An article comprising:
   the privacy device of claim 1; and
   circuitry for supplying the direct current voltage.

17. A display device comprising:
   a display pixel array;
   a display cover surface adjacent the display pixel array, the display cover surface comprising a viewing surface opposite the display pixel array; and
   the privacy device of claim 1 disposed on the viewing surface.

18. A display device of claim 17, wherein the privacy device of claim 1 is disposed between the display pixel array and the display cover surface.

19. The display device of claim 18, wherein the display cover surface comprises a touch sensor.

\* \* \* \* \*